US012812104B2

(12) United States Patent
Ikeda

(10) Patent No.: US 12,812,104 B2
(45) Date of Patent: Nov. 24, 2026

(54) IMAGE PROCESSING DEVICE AND IMAGE PROCESSING METHOD

(71) Applicant: Sony Group Corporation, Tokyo (JP)

(72) Inventor: Masaru Ikeda, Tokyo (JP)

(73) Assignee: Sony Group Corporation, Tokyo (JP)

( * ) Notice: Subject to any disclaimer, the term of this patent is extended or adjusted under 35 U.S.C. 154(b) by 75 days.

(21) Appl. No.: 18/754,233

(22) Filed: Jun. 26, 2024

(65) Prior Publication Data

US 2024/0357100 A1 Oct. 24, 2024

Related U.S. Application Data

(63) Continuation of application No. 17/432,501, filed as application No. PCT/JP2020/005472 on Feb. 13, 2020, now Pat. No. 12,081,743.

(60) Provisional application No. 62/811,126, filed on Feb. 27, 2019.

(51) Int. Cl.

| | |
|---|---|
| ***H04N 19/117*** | (2014.01) |
| ***H04N 19/159*** | (2014.01) |
| ***H04N 19/176*** | (2014.01) |
| ***H04N 19/82*** | (2014.01) |

(52) U.S. Cl.

CPC ......... *H04N 19/117* (2014.11); *H04N 19/159* (2014.11); *H04N 19/176* (2014.11); *H04N 19/82* (2014.11)

(58) Field of Classification Search

CPC .. H04N 19/117; H04N 19/159; H04N 19/176; H04N 19/82; H04N 19/136; H04N 19/86; H04N 19/119; H04N 19/184; H04N 19/59

See application file for complete search history.

(56) References Cited

U.S. PATENT DOCUMENTS

| | | | |
|---|---|---|---|
| 2005/0276505 | A1 | 12/2005 | Raveendran |
| 2012/0141037 | A1 | 6/2012 | Sato |
| 2014/0153646 | A1 | 6/2014 | Yang et al. |
| 2015/0365666 | A1 | 12/2015 | Dong et al. |
| 2016/0021379 | A1 | 1/2016 | Minezawa et al. |
| 2018/0131969 | A1 | 5/2018 | Huang |
| 2018/0205969 | A1 | 7/2018 | Wedi et al. |
| 2018/0262781 | A1 | 9/2018 | Narroschke et al. |

(Continued)

FOREIGN PATENT DOCUMENTS

| | | | |
|---|---|---|---|
| CN | 102934429 | A | 2/2013 |
| CN | 102948146 | A | 2/2013 |

(Continued)

OTHER PUBLICATIONS

Benjamin Bross et al., "Versatile Video Coding (Draft 3)", Joint Video Experts Team (JVET) of ITU-T SG 16 WP 3 and ISO/IEC JTC 1/SC 29/WG 11, No. L 1001-v9; Oct. 3-12, 2018, pp. 1-233.

(Continued)

*Primary Examiner* — Joseph W Becker

(74) *Attorney, Agent, or Firm* — XSENSUS LLP

(57) ABSTRACT

In accordance with a block structure having a hierarchical structure in which a transform block, a prediction block, and a coding block are unified, a bitstream is decoded and a decoded image is generated. A deblocking filter is applied to pixels of a line orthogonal to a sub-block boundary that is a boundary between sub-blocks obtained by dividing the transform block of the decoded image. The present technology can be applied to, for example, a case where encoding and decoding of an image are performed.

20 Claims, 16 Drawing Sheets

(56) References Cited

U.S. PATENT DOCUMENTS

| | | | |
|---|---|---|---|
| 2019/0281294 | A1 | 9/2019 | Kim et al. |
| 2020/0021834 | A1 | 1/2020 | Liu et al. |
| 2021/0329266 | A1 | 10/2021 | Andersson et al. |

FOREIGN PATENT DOCUMENTS

| | | | |
|---|---|---|---|
| EP | 3200454 | A1 | 8/2017 |
| KR | 20140033238 | A | 3/2014 |
| WO | WO-2013001886 | A1 | 1/2013 |
| WO | WO-2018066241 | A1 | 4/2018 |

OTHER PUBLICATIONS

International Search Report and Written Opinion mailed on Apr. 14, 2020, received for PCT Application PCT/JP2020/005472, Filed on Feb. 13, 2020, 9 pages including English Translation.

Misra et al., "Non-CE11: On ISP Transform Boundary Deblocking", Joint Video Experts Team (JVET) of ITU-T SG 16 WP 3 and ISO/IEC JTC 1/SC 29/WG 11, JVET-N0473-r2, Mar. 19-27, 2019, pp. 1-4.

Hernandez et al., CE3: Line-Based Intra Coding Mode (Tests 2.1.1 and 2.1.2), Joint Video Experts Team (JVET) of ITU-T SG 16 WP 3 and ISO/IEC JTC 1/SC 29/WG 11, JVET-L0076-v2, Oct. 3-12, 2018, pp. 1-9.

Tsai et al., "CE11-Related: Long Deblocking filters with Reduced line Buffer Requirement and Enhanced Parallel Processing Accessibility", Joint Video Experts Team (JVET) of ITU-T SG 16 WP 3 and ISO/IEC JTC 1/SC 29/WG 11, JVET-M0187-v1, Jan. 9-18, 2019, pp. 1-10.

Zhao et al., "CE6: Sub-Block Transform for Inter Blocks (CE6.1.2)", Joint Video Experts Team (JVET) of ITU-T SG 16 WP 3 and ISO/IEC JTC 1/SC 29/WG 11, JVET-L0358-v2, Oct. 3-12, 2018, pp. 1-9.

Ikeda et al., "CE11.1.6, CE11.1.7 and CE11.1.8: Joint Proposals for Long Deblocking from Sony, Qualcomm, Sharp, Ericsson", Joint Video Experts Team (JVET) of ITU-T SG 16 WP 3 and ISO/IEC JTC 1/SC 29/WG 11, JVET-M0471, Jan. 9-18, 2019, pp. 1-11.

Andersson (Ericsson) Ket Al: "CEII: Deblocking of sub-block boundaries for luma (CEII.3.2)", 124. MPEG Meeting; Oct. 8, 2018-Oct. 12, 2018; Macao; (Motion Picture Expert Group or ISO/IEC JTC1/SC29/WG11), No. 10074; m44080,Oct. 12, 2018 (Oct. 12, 2018), pp. 1-4, XP030190922.

High efficiency video coding; H.265 (Dec. 2016)11 f ITU-T Standard, International Telecommunication Union, Geneva ; CH No. H.265 (Dec. 2016) Dec. 22, 2016 (Dec. 22, 2016), pp. 1-664, XP044190069, Retrieved from the Internet: URL:http://mirror.itu.int/dms/pay/itu-t/re c/h/T-REC-H.265-201612-1!!PDF-E.pdf.

Andrey Norkin et al: "Chapter 7: In-Loop Filters in HEVC" In: "High Efficiency Video Coding (HEVC) ", Aug. 23, 2014 (Aug. 23, 2014), Springer International Publishing, Cham, XP055614202, ISBN: 978-3-319-06894-7 pp. 171-208.

Andersson K et al: "CEII-2.1: Deblocking for 4xN, Nx4 and 8xN and Nx8 block boundaries not aligned with 8x8 grids", 14. Jvet Meeting; Mar. 19, 2019-Mar. 27, 2019; Geneva; (The Joint Video Exploration Team of ISO/IEC JTC1/SC29/WG11 and ITU-T SG. 16 ), No. JVET-N0098 Mar. 13, 2019 (Mar. 13, 2019), XP030202823, Retrieved from the Internet: URL:http://phenix.int-evry.fr/jvet/doc_end _user/documents/14_Geneva/wgll/JVET-N0098-vl.zip JVET-N0098-vl.docx.

H Series: "ITU-T Advanced video coding for generic audiovisual services", Recommendation ITU-T H.264, Apr. 1, 2017 (Apr. 1, 2017), XP055738641, Retrieved from the Internet: URL:https://www.itu.int/reciT-REC-H.264-20 1704-S [retrieved on Oct. 12, 2020].

Chen J et al: "Algorithm description of Joint Exploration Test Model 7 (JEM7)", 7. JVET Meeting; Torino; (The Joint Video Exploration Team of ISO/IEC JTC1/SC29/WG11 and ITU-T SG. 16 ), Jul. 13, 2017-Jul. 21, 2017; Torino No. G1001_v1; JVET-GI001 Aug. 19, 2017 (Aug. 19, 2017), pp. 1-48, XP030150980, Retrieved from the Internet: URL:http://phenix.int-evry.fr/jvet/doc_end _user/documents/7_Torino/wgll/JVET-G1001-v.

Extended European Search Report issued Feb. 3, 2022, in corresponding European Patent Application No. 20763869.3.

S. De-Luxan-Hernandez, V. George, J. Ma, T. Nguyen, H. Schwarz, D. Marpe, T. Wiegand (HHI), "CE3: Intra Sub-Partitions Coding Mode (Tests 1.1.1 and 1.1.2)", JVET-M0102, Joint Video Experts Team (JVET) of ITU-T SG 16 WP 3 and ISO/IEC JTC 1/SC 29/WG 11 13th Meeting: Marrakech, MA, 918 Jan. 2019, 9 pp.

M. Ikeda, T. Suzuki (Sony), D. Rusanovskyy, M. Karczewicz (Qualcomm), W. Zhu, K. Misra, P. Cowan, A. Segall (Sharp Labs of America), K. Andersson, J. Enhorn, Z. Zhang, R. Sjoberg (Ericsson), "CE11.1.6, CE11.1.7 and CE11.1.8: Joint proposals for long deblocking from Sony, Qualcomm, Sharp, Ericsson", JVET-M0471, Joint Video Experts Team (JVET) of ITU-T SG 16 WP 3 and ISO/IEC JTC 1/SC 29/WG 11 13th Meeting: Marrakesh, MA, 918 Jan. 2019, 12 pp.

FIG. 1

| bS | Y | U | V |
|---|---|---|---|
| 2 | CONDITION RELATED TO INTRA PREDICTION (CONDITION A) | | |
| 1 | CONDITION RELATED TO PRESENCE OR ABSENCE OF SIGNIFICANT COEFFICIENT OF Y (CONDITION B1) | N/A | |
| | CONDITION RELATED TO MV AND REFERENCE PICTURE (CONDITION B2) | N/A | |
| 0 | Others | | |

FIG. 2

| bS | Y | U | V |
|---|---|---|---|
| 2 | CONDITION RELATED TO INTRA PREDICTION (CONDITION A) | | |
| 1 | CONDITION RELATED TO PRESENCE OR ABSENCE OF SIGNIFICANT COEFFICIENT OF Y (CONDITION B1) | | |
| | CONDITION RELATED TO MV AND REFERENCE PICTURE (CONDITION B2) | | |
| 0 | Others | | |

FIG. 13

| bs | Y | U | V |
|---|---|---|---|
| 2 | P or Q is in the block of intra prediction mode | | |
| | P or Q is in the block of intra prediction mode (under ISP mode && Sub-Partition boundary) | N/A (under ISP mode && Sub-Partition boundary) | N/A (under ISP mode && Sub-Partition boundary) |
| | CU or TU boundary && p or q is in the block of Combined Intra and Inter Prediction mode(CIIP) | | |
| 1 | Difference of MV and reference picture | N/A | N/A |
| | CU or TU boundary && One or more non-zero Y coef.Levels | CU or TU boundary && One or more non-zero U coef.Levels | CU or TU boundary && One or more non-zero V coef.Levels |
| | P or Q is in the block of Combined Intra and Inter Prediction mode(CIIP) | | |
| 0 | Others | | |

IMAGE PROCESSING DEVICE AND IMAGE PROCESSING METHOD

CROSS-REFERENCE TO RELATED APPLICATIONS

The present application is a continuation of U.S. application Ser. No. 17/432,501, filed Aug. 20, 2021, which is based on PCT filing PCT/JP2020/005472, filed Feb. 13, 2020, which claims priority to U.S. Provisional Patent Application No. 62/811,126, filed Feb. 27, 2019, the entire contents of each are incorporated herein by reference.

TECHNICAL FIELD

The present technology relates to an image processing device and an image processing method, and more particularly to, for example, an image processing device and an image processing method that make it possible to suppress block distortion.

BACKGROUND ART

In Joint Video Experts Team (JVET) that is a joint standardization organization of ITU-T and ISO/IEC, for the purpose of further improving coding efficiency compared to H.265/HEVC, standardization work of Versatile Video Coding (VVC) is underway that is a next-generation image coding method.

In the standardization work of VVC, in Non-Patent Document 1, it is proposed that blocks can be set in Intra Sub-Partitions (ISP).

A block set in the ISP can be divided into a plurality of sub-blocks (Sub-Partitions), and orthogonal transform can be performed in units of sub-blocks.

CITATION LIST

Non-Patent Document

Non-Patent Document 1: JVET-M0102-v5: CE3: Intra Sub-Partitions Coding Mode (version 7-date 2019-01-17)

SUMMARY OF THE INVENTION

Problems to be Solved by the Invention

At a sub-block boundary that is a boundary between the sub-blocks obtained by dividing the block set in the ISP, block distortion may occur, but (a pixel of a line orthogonal to) the sub-block boundary is not an application target of a deblocking filter.

The present technology has been made in view of such a situation, and makes it possible to suppress block distortion.

Solutions to Problems

A first image processing device of the present technology is an image processing device including: a decoding unit that decodes a bitstream to generate a decoded image in accordance with a block structure having a hierarchical structure in which a transform block, a prediction block, and a coding block are unified; and a filter unit that applies a deblocking filter to pixels of a line orthogonal to a sub-block boundary that is a boundary between sub-blocks obtained by dividing the transform block of the decoded image generated by the decoding unit.

A first image processing method of the present technology is an image processing method including: decoding a bitstream to generate a decoded image in accordance with a block structure having a hierarchical structure in which a transform block, a prediction block, and a coding block are unified; and applying a deblocking filter to pixels of a line orthogonal to a sub-block boundary that is a boundary between sub-blocks obtained by dividing the transform block of the decoded image.

In the first image processing device and image processing method of the present technology, in accordance with a block structure having a hierarchical structure in which a transform block, a prediction block, and a coding block are unified, a bitstream is decoded and a decoded image is generated. Then, a deblocking filter is applied to pixels of a line orthogonal to a sub-block boundary that is a boundary between sub-blocks obtained by dividing the transform block of the decoded image.

A second image processing device of the present technology is an image processing device including: a filter unit that generates a filter image by applying a deblocking filter to pixels of a line orthogonal to a sub-block boundary of a locally decoded image being locally decoded, when an image is encoded in accordance with a block structure having a hierarchical structure in which a transform block, a prediction block, and a coding block are unified, the sub-block boundary being a boundary between sub-blocks obtained by dividing the transform block in which intra prediction is performed; and an encoding unit that encodes the image by using the filter image generated by the filter unit.

A second image processing method of the present technology is an image processing method including: generating a filter image by applying a deblocking filter to pixels of a line orthogonal to a sub-block boundary of a locally decoded image being locally decoded, when an image is encoded in accordance with a block structure having a hierarchical structure in which a transform block, a prediction block, and a coding block are unified, the sub-block boundary being a boundary between sub-blocks obtained by dividing the transform block in which intra prediction is performed; and encoding the image by using the filter image.

In the second image processing device and image processing method of the present technology, a filter image is generated by applying a deblocking filter to pixels of a line orthogonal to a sub-block boundary of a locally decoded image being locally decoded, when an image is encoded in accordance with a block structure having a hierarchical structure in which a transform block, a prediction block, and a coding block are unified, the sub-block boundary being a boundary between sub-blocks obtained by dividing the transform block in which intra prediction is performed. Then, the image is encoded by using the filter image.

Note that, the image processing device can be implemented by causing a computer to execute a program. The program can be provided by being recorded on a recording medium or by being transmitted via a transmission medium.

BRIEF DESCRIPTION OF DRAWINGS

FIG. 1 is a diagram explaining a method of setting bS in HEVC.

FIG. 2 is a diagram explaining a method of setting bS in another method of applying a deblocking filter.

FIG. 13 is a diagram illustrating an example of a method of setting bS of a boundary strength decision unit 261.

MODE FOR CARRYING OUT THE INVENTION

Figure 3:
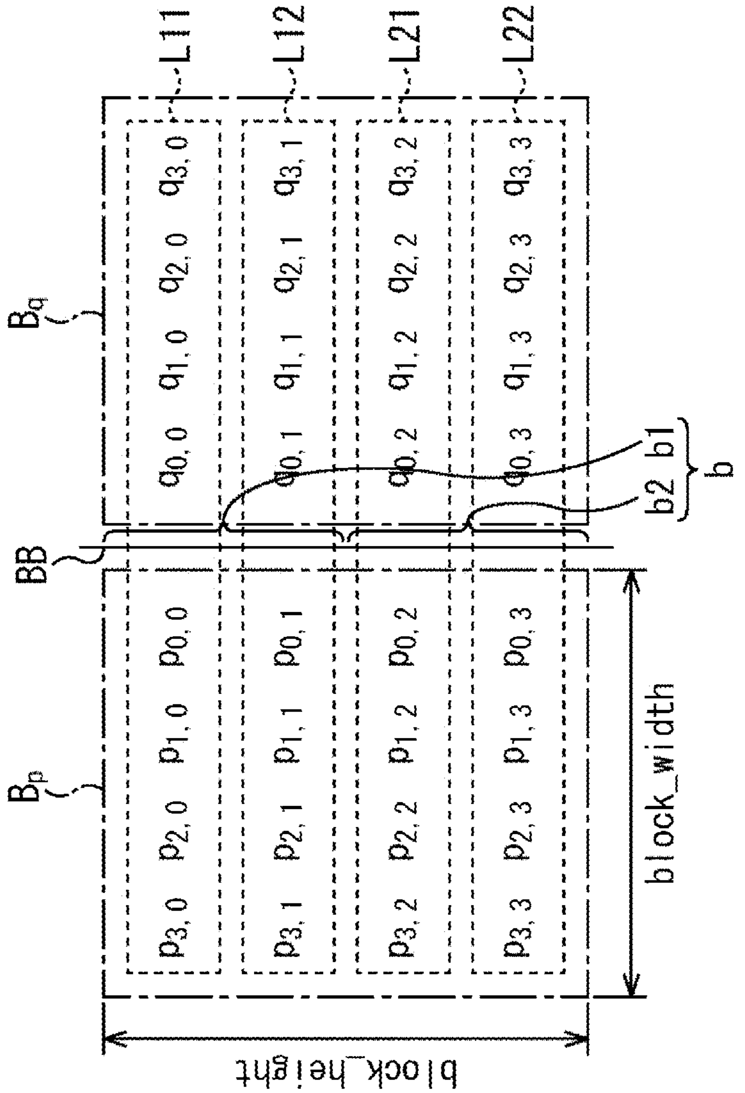
FIG. 3 is a diagram illustrating an example of (pixel values of) a block Bp and a block Bq as two adjacent blocks adjacent to each other sandwiching a vertical block boundary BB that is a block boundary in the vertical direction.

The scope disclosed in the present specification is not limited to the content of the embodiments, and the content of the following reference documents REF1 to REF8 known at the time of filing is also incorporated herein by reference. That is, the content described in the following reference documents REF1 to REF8 is also a basis for determining support requirements. For example, even in a case where a Quad-Tree Block Structure described in the reference document REF2, a Quad Tree Plus Binary Tree (QTBT) Block Structure described in the reference document REF3, and a Multi-type Tree (MTT) Block Structure described in the reference documents REF4, REF5, and REF8 are not directly defined in the detailed description of the invention, they are still within the scope of the present disclosure and shall meet the support requirements of the claims. Furthermore, similarly, even in a case where technical terms, for example, parsing, syntax, semantics, and the like are not directly defined in the detailed description of the invention, they are still within the scope of the present disclosure and shall meet the support requirements of the claims.

REF1: Recommendation ITU-T H.264 (04/2017) "Advanced video coding for generic audiovisual services", April 2017

REF2: Recommendation ITU-T H.265 (12/2016) "High efficiency video coding", December 2016

REF3: J. Chen, E. Alshina, G. J. Sullivan, J.-R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017

REF4: B. Bross, J. Chen, S. Liu, "Versatile Video Coding (Draft 3)," JVET-L1001, Joint Video Experts Team (JVET) of ITU-T SG 16 WP 3 and ISO/IEC JTC 1/SC 29/WG 11 12th Meeting: Macau, CN, 312 October 2018

REF5: J. J. Chen, Y. Ye, S. Kim, "Algorithm description for Versatile Video Coding and Test Model 3 (VTM 3)", JVET-L1002, Joint Video Experts Team (JVET) of ITU-T SG 16 WP 3 and ISO/IEC JTC 1/SC 29/WG 11 12th Meeting: Macau, CN, 312 October 2018

REF6: J. Boyce (Intel), Y. Ye (InterDigital), Y.-W. Huang (Mediatek), M. Karczewicz (Qualcomm), E. Francois (Technicolor), W. Husak (Dolby), J. Ridge (Nokia), A. Abbas (GoPro), "Two tier test model", JVET-J0093, Joint Video Experts Team (JVET) of ITU-T SG 16 WP 3 and ISO/IEC JTC 1/SC 29/WG 11 10th Meeting: San Diego, US, 120 April 2018

REF7: S. De-Luxan-Hernandez, V. George, J. Ma, T. Nguyen, H. Schwarz, D. Marpe, T. Wiegand (HHI), "CE3: Intra Sub-Partitions Coding Mode (Tests 1.1.1 and 1.1.2)", JVET-M0102, Joint Video Experts Team (JVET) of ITU-T SG 16 WP 3 and ISO/IEC JTC 1/SC 29/WG 11 13th Meeting: Marrakech, MA, 918 January 2019

REF8: M. Ikeda, T. Suzuki (Sony), D. Rusanovskyy, M. Karczewicz (Qualcomm), W. Zhu, K. Misra, P. Cowan, A. Segall (Sharp Labs of America), K. Andersson, J. Enhorn, Z. Zhang, R. Sjoberg (Ericsson), "CE11.1.6, CE11.1.7 and CE11.1.8: Joint proposals for long deblocking from Sony, Qualcomm, Sharp, Ericsson", JVET-M0471, Joint Video Experts Team (JVET) of ITU-T SG 16 WP 3 and ISO/IEC JTC 1/SC 29/WG 11 13th Meeting: Marrakesh, MA, 918 January 2019

<Overview of Deblocking Filter>

A process related to a deblocking filter in an existing image coding method such as HEVC includes filtering decision (application necessity decision and filtering strength decision) and filtering (application of a filter). In the following, an overview of the deblocking filter will be described using HEVC as an example.

Note that, application necessity of the deblocking filter means whether or not the deblocking filter is applied. The application necessity decision of the deblocking filter means deciding whether or not the deblocking filter is applied. Furthermore, a decision result of the application necessity decision is a result of deciding whether or not the deblocking filter is applied. The decision result of the application necessity decision may be information indicating either "apply" or "not apply".

The filtering strength decision means deciding (determining) filtering strength of a deblocking filter in a case where the deblocking filter is applied. For example, in a case where there are a weak filter, and a strong filter having a larger number of taps, that is, stronger filtering strength, than the weak filter, in the filtering strength decision, it is decided (determined) which of the weak filter and the strong filter is used as the deblocking filter to be applied to pixels.

Regarding the deblocking filter, the application necessity decision and the filtering strength decision decide that the deblocking filter is not applied or a type of the deblocking filter to be applied.

For example, in a case where there are the weak filter and the strong filter as the deblocking filter, in the application necessity decision and the filtering strength decision, it is decided that the deblocking filter is not applied, the weak filter is applied, or the strong filter is applied. Hereinafter, the application necessity decision and the filtering strength decision are also collectively referred to as filtering decision.

Furthermore, in the present specification, a decoded image includes a locally decoded image locally decoded at the time of encoding.

In the process related to the deblocking filter, first, the filtering decision is performed. In the filtering decision, first, application necessity decision is performed for deciding whether or not the deblocking filter is applied to the block boundary of the decoded image.

Note that, in HEVC, the block boundary is identified on the basis of a block structure of a Quad-Tree Block Structure described in the reference document REF2. Specifically, among edges of an 8×8 pixel block (sample grid) that is the minimum block unit, an edge that satisfies a condition that the edge is at least one of a Transform Unit (TU) boundary or a Prediction Unit (PU) boundary is identified as the block boundary in HEVC.

The application necessity decision is performed on the basis of boundary strength (hereinafter also referred to as bS) of the block boundary. In HEVC, when four lines in a direction orthogonal to a partial block boundary (a part of the block boundary), which is a unit of processing when the filtering decision (application necessity decision) of the deblocking filter is performed on the block boundary, are defined as a unit of filter application to which the deblocking filter is applied, the bS is set every four lines that are the unit of filter application. In a case where the block boundary is a vertical block boundary in the vertical direction, a line of the unit of filter application is a line (row) in the horizontal direction orthogonal to the vertical block boundary. Furthermore, in a case where the block boundary is a horizontal block boundary in the horizontal direction, a line of the unit of filter application is a line (column) in the vertical direction orthogonal to the horizontal block boundary.

FIG. 1 is a diagram explaining a method of setting bS in HEVC.

As illustrated in FIG. 1, in HEVC, the bS is set on the basis of truth or falsehood (satisfied or not satisfied) of a condition A that is a condition related to intra prediction, a condition B1 that is a condition related to a significant coefficient of the Y component, and a condition B2 that is a condition related to a motion vector (MV) and a reference image (reference picture). Referring to FIG. 1, the bS is set to 2 in a case where the condition A is true. Furthermore, in a case where the condition A is false and at least one of the condition B1 or the condition B2 is true, the bS is set to 1. Then, in a case where the condition A, the condition B1, and the condition B2 are all false, the bS is set to 0. Note that, the conditions A, B1, and B2 illustrated in FIG. 1 are as follows. Furthermore, here, for the sake of simplicity, the block boundary is assumed to be, for example, a vertical block boundary.

Condition A: Among Coding Units (CUs) including pixels of the uppermost line among lines orthogonal to the block boundary that is a setting target of the bS and sandwiching the block boundary, a prediction mode of at least one of the CUs is an intra prediction mode.

Condition B1: The block boundary is the TU boundary, and among two TUs including pixels of the uppermost line among lines orthogonal to the block boundary that is a setting target of the bS and sandwiching the block boundary, the significant coefficient of the Y component exists in at least one of the TUs.

Condition B2: Between two CUs including pixels of the uppermost line among lines orthogonal to the block boundary that is a setting target of the bS and sandwiching the block boundary, an absolute value of a difference between MVs is one pixel or more, or reference images of motion compensation are different from each other or the numbers of MVs are different from each other.

In HEVC, a deblocking filter for the luminance component (Y component) of the decoded image can be applied to the block boundary for which the bS set as described above is set to greater than or equal to 1. In HEVC, the decision result of the application necessity decision of the deblocking filter for the luminance component of the decoded image may differ depending on whether or not the condition B1 and the condition B2 are satisfied.

Note that, in HEVC, as the deblocking filter for the luminance component of the decoded image, the strong filter having a high filtering strength and the weak filter having a low filtering strength are prepared. In a case where the bS is greater than or equal to 1, in a process related to the deblocking filter for the luminance component of the decoded image, application necessity decision based on additional conditions is further performed, and then decision of the filtering strength and filtering are performed. Details of these processes are described in the reference document REF2, and the description thereof is omitted here.

On the other hand, a deblocking filter for the color difference components (U component, V component) of the decoded image in HEVC is applied only to the block boundary whose bS is 2. For that reason, as illustrated in FIG. 1, whether or not the conditions B1 and B2 are satisfied does not affect the application necessity decision of the deblocking filter to the color difference components of the decoded image, in HEVC.

Furthermore, in HEVC, the deblocking filter that can be applied to the color difference components of the decoded image is only the weak filter. For that reason, a filtering strength decision process is not necessary for the color difference components of the decoded image, and in a case where the bS is 2, the weak filter is applied to the color difference components of the decoded image.

By the way, as described in the reference document REF3, in the block division by the QTBT Block Structure in VVC, a block having a larger size can be selected than that in the block division by the Quad-Tree Block Structure in HEVC. In a case where the block size is large in a flat area (an area in which a change in pixel value in the area is small), block distortion is likely to occur. For that reason, in VVC in which a block having a larger size can be selected, in a case where the deblocking filter that can be applied to the color difference components of the decoded image is only the weak filter similarly to HEVC, there has been a possibility that a remarkable block distortion remains in the color difference components. In view of such a situation, it is desired to improve the deblocking filter for the color difference components of the decoded image.

Thus, another method of applying the deblocking filter has been devised, which is different from that in HEVC. In the other method of applying the deblocking filter, it has been devised that, for example, the deblocking filter that can be applied to the color difference components is changed to two types similarly to the deblocking filter that can be applied to the luminance component, and the strong filter can be applied also to the color difference components. Furthermore, it has also been devised that the deblocking filter can be applied to the color difference components of the decoded image not only in a case where the bS is 2 but also in a case where the bS is 1.

FIG. 2 is a diagram explaining a method of setting bS in the other method of applying the deblocking filter.

In the other method of applying the deblocking filter, the bS is set on the basis of the conditions A, B1, and B2 described above, similarly to the example in HEVC illustrated in FIG. 2. However, as described above, the deblocking filter can be applied to the color difference components of the decoded image not only in the case where the bS is 2 but also in the case where the bS is 1. As illustrated in FIG. 2, the decision result of the application necessity decision of the deblocking filter for the color difference components (U component, V component) of the decoded image may differ depending on whether or not the condition B1 and the condition B2 are satisfied.

FIG. 3 is a diagram illustrating an example of (pixel values of) a block Bp and a block Bq as two adjacent blocks adjacent to each other sandwiching a vertical block boundary BB that is a block boundary in the vertical direction.

Note that, here, the vertical block boundary will be described as an example, but the matters described for the vertical block boundary can be similarly applied to the horizontal block boundary that is the block boundary in the horizontal direction unless otherwise specified. Furthermore, although FIG. 3 illustrates an example in which the block Bp and the block Bq are blocks of 4×4 pixels, the matters described here can be similarly applied to blocks of other sizes.

In the example of FIG. 3, the pixel values (and pixels) in the block Bp are indicated by symbols $p_{i,j}$. The i is a column index and the j is a row index. The column indexes i are numbered 0, 1, 2, and 3 in order from a column closest to the vertical block boundary BB (from left to right in the figure). The row indexes j are numbered 0, 1, 2, and 3 from top to bottom. On the other hand, the pixel values (and pixels) in the block Bq are indicated by symbols $q_{k,j}$. The k is a column index and the j is a row index. The column indexes k are numbered 0, 1, 2, and 3 in order from a column closest to the vertical block boundary BB (from right to left in the figure). The pixel values here are the luminance components or the color difference components.

Note that, in FIG. 3, the block boundary BB is assumed to be the vertical block boundary, but the block boundary BB can be regarded as the horizontal block boundary, and the block Bp and the block Bq can be regarded as two adjacent blocks adjacent to each other sandwiching the horizontal block boundary BB. In this case, in the $p_{i,j}$, the i is a row index and the j is a column index. The same applies to the $q_{k,j}$.

In the other method of applying the deblocking filter, after the bS is set as described with reference to FIG. 2, the filtering decision is performed using the following three conditions.

The filtering decision is performed in units of four lines for the luminance component, and in units of lines of the color difference components corresponding to the four lines of the luminance component for the color difference components.

In a case where the color format of the decoded image is, for example, the YUV420 format, horizontal and vertical densities of the pixels of the color difference components are ½ of horizontal and vertical densities of the pixels of the luminance component, respectively.

Thus, in a case where the color format of the decoded image is the YUV420 format, the filtering decision is performed for the color difference components in units of two lines of the color difference components corresponding to four lines of the luminance component.

That is, in the case where the color format of the decoded image is the YUV420 format, for the color difference components, a partial vertical block boundary that is a unit of processing when it is decided whether or not the deblocking filter is applied to (pixels in the horizontal direction orthogonal to) the vertical block boundary BB, is a vertical block boundary for two lines of the color difference components continuous in the vertical direction (a portion orthogonal to two consecutive lines of the color difference components in the horizontal direction, of the vertical block boundary). The filtering decision of the color difference components is performed for each such partial vertical block boundary.

Now, it is assumed that the block Bp and the block Bq illustrated in FIG. 3 are blocks of the luminance component. In this case, the filtering decision of the luminance component is performed for a partial vertical block boundary b for four lines of a line L11, a line L12, a line L21, and a line L22.

Furthermore, it is assumed that the block Bp and the block Bq illustrated in FIG. 3 are blocks of color difference components. In this case, the filtering decision of the color difference components is performed for each of a partial vertical block boundary b1 for two lines of the line L11 and the line L12, and a partial vertical block boundary b2 for two lines of the line L21 and the line L22.

The filtering decision for the partial vertical block boundary b1 is performed using (pixels of) the line L11 and the line L12 (of the color difference components) in the horizontal direction orthogonal to the partial vertical block boundary b1. Similarly, the filtering decision for the partial vertical block boundary b2 is performed using the line L21 and the line L22 in the horizontal direction orthogonal to the partial vertical block boundary b2.

In the filtering decision of the other method of applying the deblocking filter, in the application necessity decision, it is decided in order whether or not a condition C91 and a condition C92 below are true.

Condition C91: (bS==2|| bS==1 && (block_width>16 && block_height>16))

Condition C92: d<beta

Note that, in the condition C91, the block_width and the block_height are the horizontal size and the vertical size of a block (for example, CU) over the partial vertical block boundary b1 to be subjected to the filtering decision, as illustrated in FIG. 3. || represents a logical sum operation, and && represents a logical product operation.

Furthermore, the variable beta in the condition C92 is an edge decision threshold value, and the variable beta is given depending on a quantization parameter. Furthermore, the variable d in the condition C92 is set by the following equations (1) to (7).

$$dp0 = \mathrm{Abs}(p_{2,0} - 2*p_{1,0} + p_{0,0}) \quad (1)$$

$$dp1 = \mathrm{Abs}(p_{2,3} - 2*p_{1,3} + p_{0,3}) \quad (2)$$

$$dq0 = \mathrm{Abs}(q_{2,0} - 2*q_{1,0} + q_{0,0}) \quad (3)$$

$$dq1 = \mathrm{Abs}(q_{2,3} - 2*q_{1,3} + q_{0,3}) \quad (4)$$

$$dpq0 = dp0 + dq0 \quad (5)$$

-continued $$dpq1 = dp1 + dq1 \quad (6)$$

$$d = dpq0 + dpq1 \quad (7)$$

Note that, the condition C92 is similar to a condition used in the filtering decision of the deblocking filter applied to the luminance component in HEVC (hereinafter, referred to as a condition in the luminance component) except that a line used for the filtering decision is different. Under the condition of the luminance component, pixels of the first line and pixels of the fourth line are used, and the filtering decision is performed for each partial vertical block boundary for four lines (segments) (a portion of the vertical block boundary orthogonal to four lines continuous in the vertical direction).

Furthermore, in a case where the color format is the YUV420 format, the density of the pixels in each of the horizontal direction and vertical direction of the color difference components (U component, V component) are half the density of the pixels of the luminance component, and four lines of the luminance component correspond to two lines of the color difference components. For that reason, in the YUV420 format, as described above, for the color difference components, for each partial vertical block boundary (for example, partial vertical block boundaries b1 and b2) for two lines of the color difference components corresponding to the four lines of the luminance component, the filtering decision is performed using pixels of the first line and the second line of the color difference components orthogonal to the partial vertical block boundary.

That is, for example, for the partial vertical block boundary b1, the filtering decision is performed using the pixels $p_{i,1}$ and $q_{k,1}$ of the second line of the color difference components instead of the pixels $p_{i,3}$ and $q_{k,3}$ of the fourth line of the luminance component of the equations (2) and (4).

In a case where at least one of the condition C91 or the condition C92 is false, the deblocking filter is not applied to the color difference components of the decoded image. On the other hand, in a case where both the condition C91 and the condition C92 are true, the filtering strength decision is performed in the filtering decision.

In the filtering strength decision, as a decision of which of the strong filter and the weak filter is applied, for example, it is decided whether or not a condition C93 is true.

Condition C93: (block_width>16 && block_height>16)

Note that, the block_width and block_height in the condition C93 are the horizontal size and the vertical size of a block over the partial vertical block boundary to be subjected to the filtering decision, similarly to the block_width and block_height in the condition C91.

In a case where the condition C93 is true, the strong filter is applied to the decoded image at the partial vertical block boundary, and in a case where the condition C93 is false, the weak filter is applied to the decoded image at the partial vertical block boundary.

As the strong filter applied to the color difference components and the luminance component, the strong filter applied to the luminance component in HEVC can be adopted. In this case, the strong filter is represented by the following equations (8) to (13).

$$p_0' = \mathrm{Clip3}(p_0 - 2*tc,\ p_0 + 2*t_c,\ (p_2 + 2*p_1 + 2*p_0 + 2*q_0 + q_1 + 4) \gg 3) \quad (8)$$

$$p_1' = \mathrm{Clip3}(p_1 - 2*tc,\ p_1 + 2*t_c,\ (p_2 + p_1 + p_0 + q_0 + 2) \gg 2) \quad (9)$$

$$p_2' = \mathrm{Clip3}(p_2 - 2*tc,\ p_2 + 2*t_c,\ (2*p_3 + 3*p_2 + p_1 + p_0 + q_0 + 4) \gg 3) \quad (10)$$

$$q_0' = \mathrm{Clip3}(q_0 - 2*tc,\ q_0 + 2*t_c,\ (p_1 + 2p_0 + 2q_0 + 2q_1 + q_2 + 4) \gg 3) \quad (11)$$

$$q_1' = \mathrm{Clip3}(q_1 - 2*tc,\ q_1 + 2*t_c,\ (p_0 + q_0 + q_1 + q_2 + 2) \gg 2) \quad (12)$$

$$q_2' = \mathrm{Clip3}(q_2 - 2*t_c,\ q_2 + 2*t_c,\ (p_0 + q_0 + q_1 + 3*q_2 + 2*q_3 + 4) \gg 3) \quad (13)$$

Note that, in the equations (8) to (13), the $p_i$ and $q_k$ represent pixel values before the deblocking filter application. Furthermore, the $p_i'$ and $q_k'$ represent pixel values after the deblocking filter application. Here, the i and k are column indexes in the block Bp and the block Bq described above, respectively, and row indexes are omitted since they are the same in equations (8) to (13). Furthermore, the $t_c$ is a parameter given depending on the quantization parameter. Furthermore, the Clip3 (a, b, c) represents a clipping process in which the value c is clipped in a range of a≤c≤b.

As the weak filter applied to the color difference components and the luminance component, the weak filter applied to the luminance component in HEVC can be adopted.

<ISP>

Figure 4:
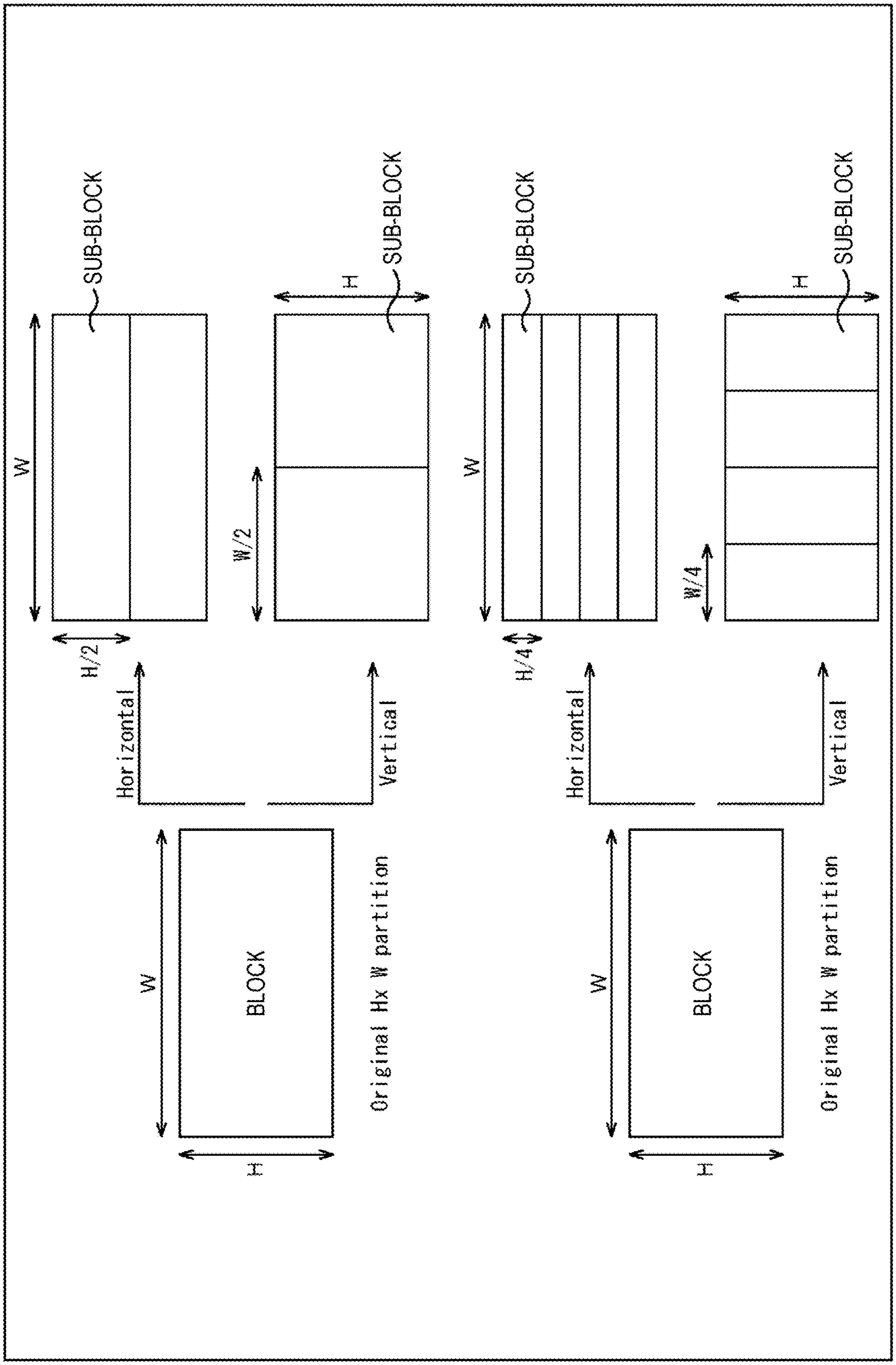
FIG. 4 is a diagram explaining intra-sub-partition (ISP).

FIG. 4 is a diagram explaining an intra-sub-partition (ISP).

In Non-Patent Document 1, the block structure has a hierarchical structure in which a Transform Unit (TU) that is a transform block that is a unit of orthogonal transform, a Prediction Unit (PU) that is a prediction block that is a unit of prediction, and a Coding Unit (CU) that is a coding block that is a unit of encoding are unified in the same block.

Then, there is an intra-sub-partition (ISP) as a block mode applied to the block of the luminance component. When the block is set in the ISP, it can be divided into a plurality of sub-blocks (Sub-Partitions), and orthogonal transform can be performed in units of sub-blocks.

Division of the block set in the ISP into the sub-blocks can be performed selecting division into two or division into four in the same horizontal or vertical direction (one-dimensional direction), for a block whose number of pixels (number of luminance components) is greater than or equal to 64.

That is, as the division of the block set in the ISP into the sub-blocks, as illustrated in FIG. 4, division can be performed into two equal parts or four equal parts in the horizontal direction or the vertical direction. Thus, when the width×height of the block is represented by W×H, the block can be divided into two sub-blocks of W×H/2, two sub-blocks of W/2×H, four sub-blocks of W×H/4, or four sub-blocks of W/4×H.

For the block set in the ISP, and for the sub-blocks obtained by dividing the block, intra prediction is performed. Block distortion is likely to occur at the block boundary of the block in which the intra prediction is performed, but in Non-Patent Document 1, the block boundary of the sub-block (sub-block boundary) is not a target of application of the deblocking filter.

Thus, in the present technology, the deblocking filter can be applied to (pixels of a line orthogonal to) the sub-block boundary as the target of application of the deblocking filter. As a result, the block distortion occurring at the sub-block boundary can be suppressed.

For example, the same bS as the bS (BS) set at the block boundary in a case where the block adjacent to the block boundary is a block subjected to intra prediction is set as the bS of the sub-block boundary, whereby the deblocking filter can be applied to the sub-block boundary. In FIGS. 1 and 2, the bS set at the block boundary in the case where the block adjacent to the block boundary is the block subjected to intra prediction is 2, and the bS of the sub-block boundary can therefore be set to 2. Note that, as the bS of the sub-block boundary, other values, for example, 1 can be set.

Note that, as a case where the block is divided into sub-blocks, in addition to a case where the ISP is set, there is a case where Sub-Block Transform (SBT) is set. Also in a case where the SBT is set, the deblocking filter can be applied to the sub-block boundary similarly to the case where the ISP is set.

Figure 5:
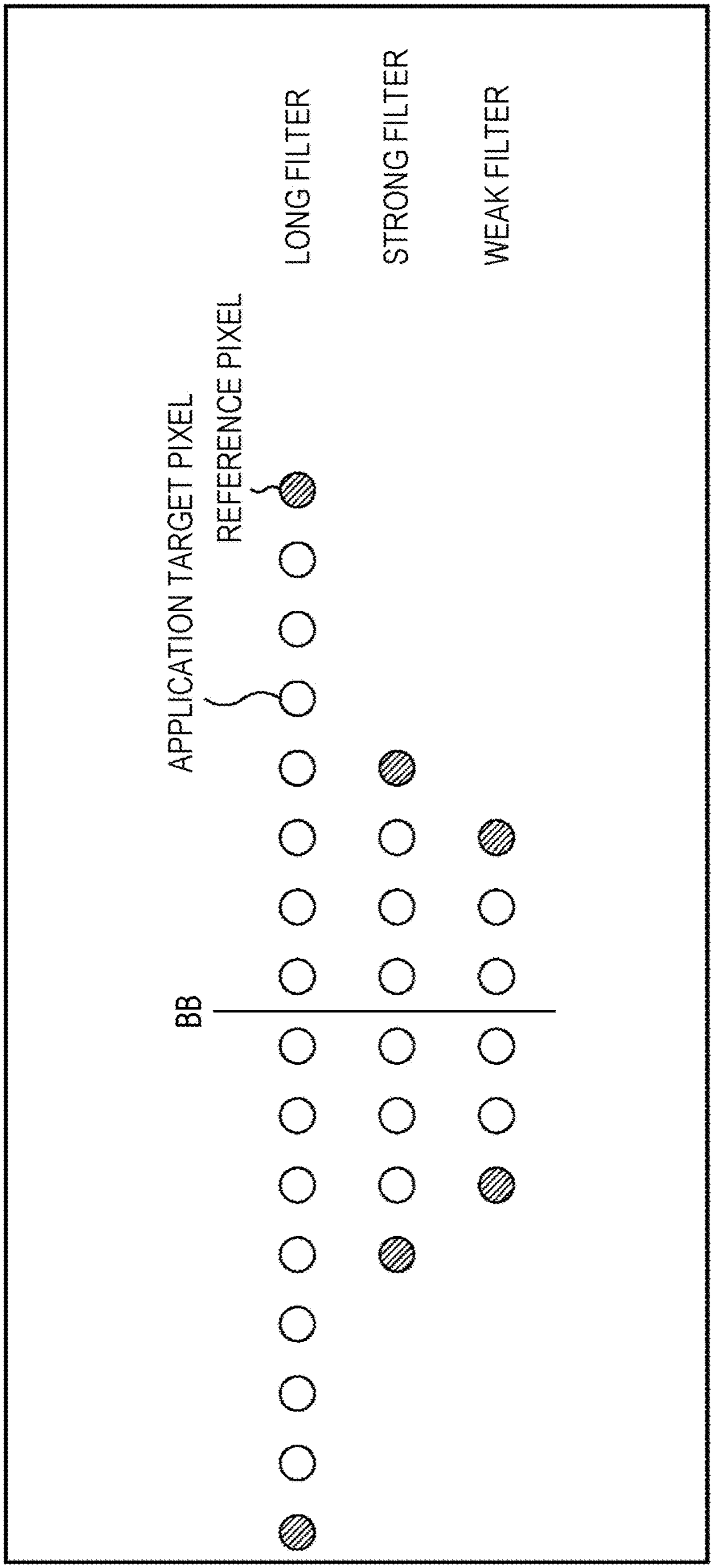
FIG. 5 is a diagram illustrating an example of a filter type of the deblocking filter.

FIG. 5 is a diagram illustrating an example of a filter type of the deblocking filter.

As the filter type (type) of the deblocking filter, for example, three types, a long filter, a strong filter, and a weak filter, can be adopted. The long filter, the strong filter, and the weak filter are, in that order, filters having stronger filtering strength (higher smoothness).

The deblocking filter is applied to a predetermined number of pixels continuously adjacent to the block boundary BB, among pixels of a line orthogonal to the block boundary BB. Here, a pixel to which the deblocking filter is applied is also referred to as an application target pixel. Furthermore, a pixel that is not the application target pixel but is referred to in application of the deblocking filter, that is, a pixel used for filter calculation as the application of the deblocking filter is also referred to as a reference pixel. Note that, the application target pixel may be referred to in the application of the deblocking filter.

For example, in a case where the block boundary BB is a vertical block boundary, in the long filter, among the pixels of the line orthogonal to the block boundary BB, seven pixels continuously adjacent to the left of the block boundary BB and seven pixels continuously adjacent to the right of the block boundary BB are application target pixels. Furthermore, among the pixels of the line orthogonal to the block boundary BB, the eighth pixels from the block boundary BB are reference pixels.

Note that, the long filter can be applied to (pixels of) a block having 32 pixels or more on each side.

In the strong filter, among the pixels of the line orthogonal to the block boundary BB, three pixels continuously adjacent to the left of the block boundary BB and three pixels continuously adjacent to the right of the block boundary BB are application target pixels. Furthermore, among the pixels of the line orthogonal to the block boundary BB, the fourth pixels from the block boundary BB are reference pixels.

In the weak filter, among the pixels of the line orthogonal to the block boundary BB, two pixels continuously adjacent to the left of the block boundary BB and two pixels continuously adjacent to the right of the block boundary BB are application target pixels. Furthermore, among the pixels of the line orthogonal to the block boundary BB, the third pixels from the block boundary BB are reference pixels.

Note that, in the weak filter, among the pixels of the line orthogonal to the block boundary BB, only the first pixels from the block boundary BB, that is, one pixel adjacent to the left of the block boundary and one pixel adjacent to the right can be set as application target pixels. In this case, among the pixels of the line orthogonal to the block boundary BB, the second and third pixels from the block boundary BB are reference pixels.

In the above, the application of the deblocking filter has been described in a case where the block boundary BB is the vertical block boundary, but the same applies to the application of the deblocking filter in a case where the block boundary BB is the horizontal block boundary.

By the way, as described in FIG. 4, a block having 64 pixels or more set in the ISP can be divided into sub-blocks by division into two or division into four in the same horizontal or vertical direction. Thus, the block can be divided into sub-blocks having block sizes of 1×N, N×1, 2×N, N×2, 4×N, or N×4. For example, in a case where the block is a block of 4×16 pixels, the block can be divided into sub-blocks having a block size of 2×16 pixels or 1×16 pixels.

On the other hand, the application of the deblocking filter can be performed to (pixels adjacent to each of) a plurality of block boundaries in parallel. For example, the deblocking filter can be applied in parallel (simultaneously) to pixels adjacent to each vertical block boundary BB on a certain horizontal line. Here, applying the deblocking filter to a plurality of vertical block boundaries in parallel is also referred to as parallel application of the deblocking filter. With the parallel application of the deblocking filter, the processing speed can be increased.

In a case where (the pixels of the line orthogonal to) the sub-block boundary is set as the target of application of the deblocking filter as described in FIG. 4, inconvenience may occur when the parallel application of the deblocking filter is performed.

Figure 6:
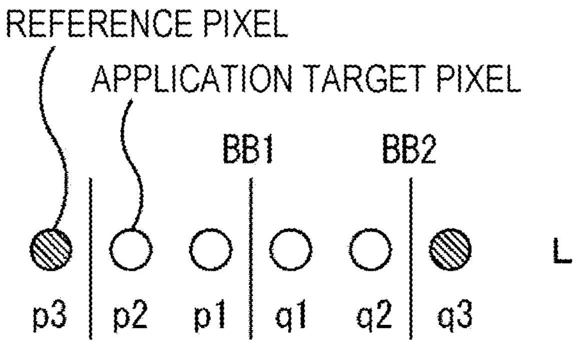
FIG. 6 is a diagram explaining inconvenience that may occur when parallel application of the deblocking filter is performed.

FIG. 6 is a diagram explaining inconvenience that may occur when the parallel application of the deblocking filter is performed.

FIG. 6 illustrates pixels of a certain horizontal line L in a case where sub-blocks having a sub-block size of 2×N are arranged in the horizontal direction.

Here, it is assumed that among the three (filter types of) deblocking filters described in FIG. 5, for example, the weak filter is applied.

In a case where the weak filter is applied to a certain vertical block boundary BB1, two pixels p1 and p2, and two pixels q1 and q2 on the horizontal line L, which are continuously adjacent to the vertical block boundary BB1, are application target pixels. Moreover, in this case, the third pixels p3 and q3 from the vertical block boundary BB1 on the horizontal line L are reference pixels.

On the other hand, in a case where the weak filter is applied to a vertical block boundary BB2 adjacent to the right of the vertical block boundary BB1, the pixels q1 to q3 are application target pixels.

Thus, the pixels q1 and q2 that are the application target pixels and the q3 that is the reference pixel in the case where the weak filter is applied to the vertical block boundary BB1 are also the application target pixels in the case where the weak filter is applied to the vertical block boundary BB2.

For this reason, between before and after the weak filter is applied to the vertical block boundary BB1, or between before and after the weak filter is applied to the vertical block boundary BB2, pixel values (luminance components) of the pixels q1 to q3 change. Then, due to the change, the pixel values of the application target pixels q1 and q2 change depending on a timing when the weak filter is applied to the vertical block boundaries BB1 and BB2.

Furthermore, regarding the pixels q1 and q2 that are application target pixels in both the case where the weak filter is applied to the vertical block boundary BB1 and the case where the vertical block boundary BB12 weak filter is applied, conflict of writing of the pixel values may occur between the case where the weak filter is applied to the vertical block boundary BB1 and the case where the weak filter is applied to the vertical block boundary BB12.

The same applies to the strong filter and the long filter that have more application target pixels than the weak filter.

In the present technology, inconvenience is suppressed, such as the change in the pixel values of the application target pixels due to the timing when the weak filter is applied or the conflict of writing the pixel values as described above, which may occur when the parallel application of the deblocking filter is performed.

For that reason, in the present technology, the deblocking filter is applied so that application target pixels to which the deblocking filter is applied at one sub-block boundary do not include pixels referred to in application of the deblocking filter at another sub-block boundary.

Furthermore, in the present technology, in a case where it is not possible to apply the deblocking filter so that the application target pixels to which the deblocking filter is applied at one sub-block boundary do not include the pixels referred to in the application of the deblocking filter at the other sub-block boundary, that is, a sub-block boundary adjacent to the one sub-block boundary (hereinafter, also referred to as an adjacent sub-block boundary), the application of the deblocking filter is limited (the deblocking filter is not applied).

In FIG. 6, it is not possible to apply the deblocking filter so that, for example, the application target pixels q1 to q3 to which the deblocking filter is applied at the sub-block boundary BB2 do not include the pixels p1 to p3 and q1 to q3 referred to in the application of the deblocking filter at the sub-block boundary BB1 as the adjacent sub-block boundary. For that reason, the application of the deblocking filter is limited.

For the deblocking filter described in FIG. 5, in a case where the size of the sub-block in a direction orthogonal to the sub-block boundary is one or two pixels, that is, in a case where the block size of the sub-block adjacent to the sub-block boundary is 1×N, N×1, 2×N, or N×2, it is not possible to apply the deblocking filter so that the application target pixels to which the deblocking filter is applied at one sub-block boundary do not include pixels referred to in the application of the deblocking filter at the adjacent sub-block boundary.

Thus, in the present technology, the application of the deblocking filter is limited at the sub-block boundary of a sub-block having a block size of 1×N, N×1, 2×N, or N×2. As a result, it is possible to suppress the occurrence of inconvenience in a case where the parallel application of the deblocking filter is performed.

Furthermore, in a case where the size of the sub-block in the direction orthogonal to the sub-block boundary is four pixels, that is, in a case where the block size of the sub-block adjacent to the sub-block boundary is 4×N or N×4, by setting only the first pixels from the block boundary as the application target pixels, it is possible to apply the deblocking filter so that application target pixels to which the weak filter is applied at one sub-block boundary do not include pixels referred to in application of the weak filter at the adjacent sub-block boundary.

Thus, in the present technology, at the sub-block boundary of a sub-block having a block size of 4×N or N×4, only the weak filter can be applied in which only the first pixels from the sub-block boundary are the application target pixels. In this case, the parallel application of the deblocking filter can be performed without causing any inconvenience.

Then, in the present technology, in a case where the size of the sub-block in the direction orthogonal to the sub-block boundary is eight pixels or more, that is, in a case where the block size of the sub-block adjacent to the sub-block boundary is a block size of 8×N or more, or N×8 or more, the deblocking filter can be applied selected by a predetermined method from among the weak filter, the strong filter, and the long filter.

<Image Processing System to which the Present Technology is Applied>

Figure 7:
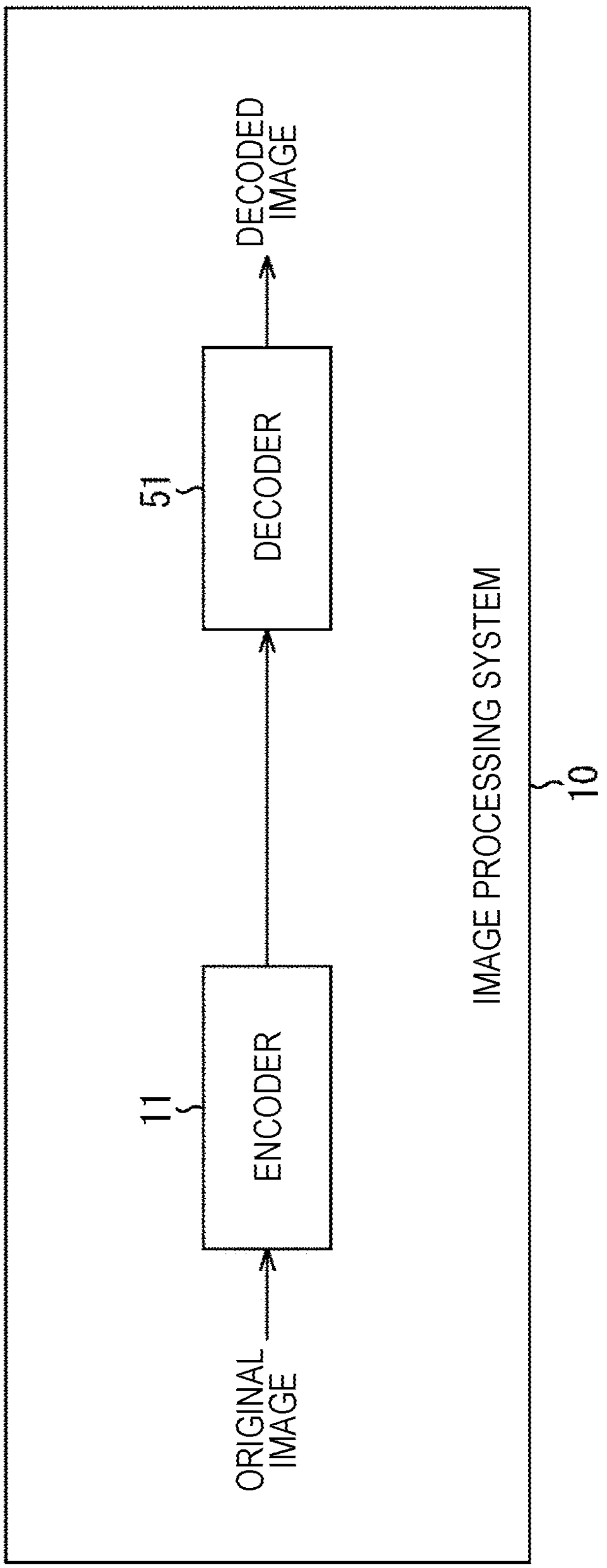
FIG. 7 is a block diagram illustrating a configuration example of an embodiment of an image processing system to which the present technology is applied.

FIG. 7 is a block diagram illustrating a configuration example of an embodiment of an image processing system to which the present technology is applied.

An image processing system 10 includes an image processing device as an encoder 11, and an image processing device as a decoder 51.

The encoder 11 encodes an original image to be encoded supplied to the encoder 11 and outputs an encoded bitstream obtained by the encoding. The encoded bitstream is supplied to the decoder 51 via a recording medium or a transmission medium (not illustrated).

The decoder 51 decodes the encoded bitstream supplied to the decoder 51 and outputs a decoded image obtained by the decoding.

In the encoder 11 and the decoder 51, encoding and decoding are each performed in accordance with a block structure having a hierarchical structure in which the TU (transform block), PU (prediction block), and CU (coding block) are unified in the same block.

Configuration Example of Encoder 11

Figure 8:
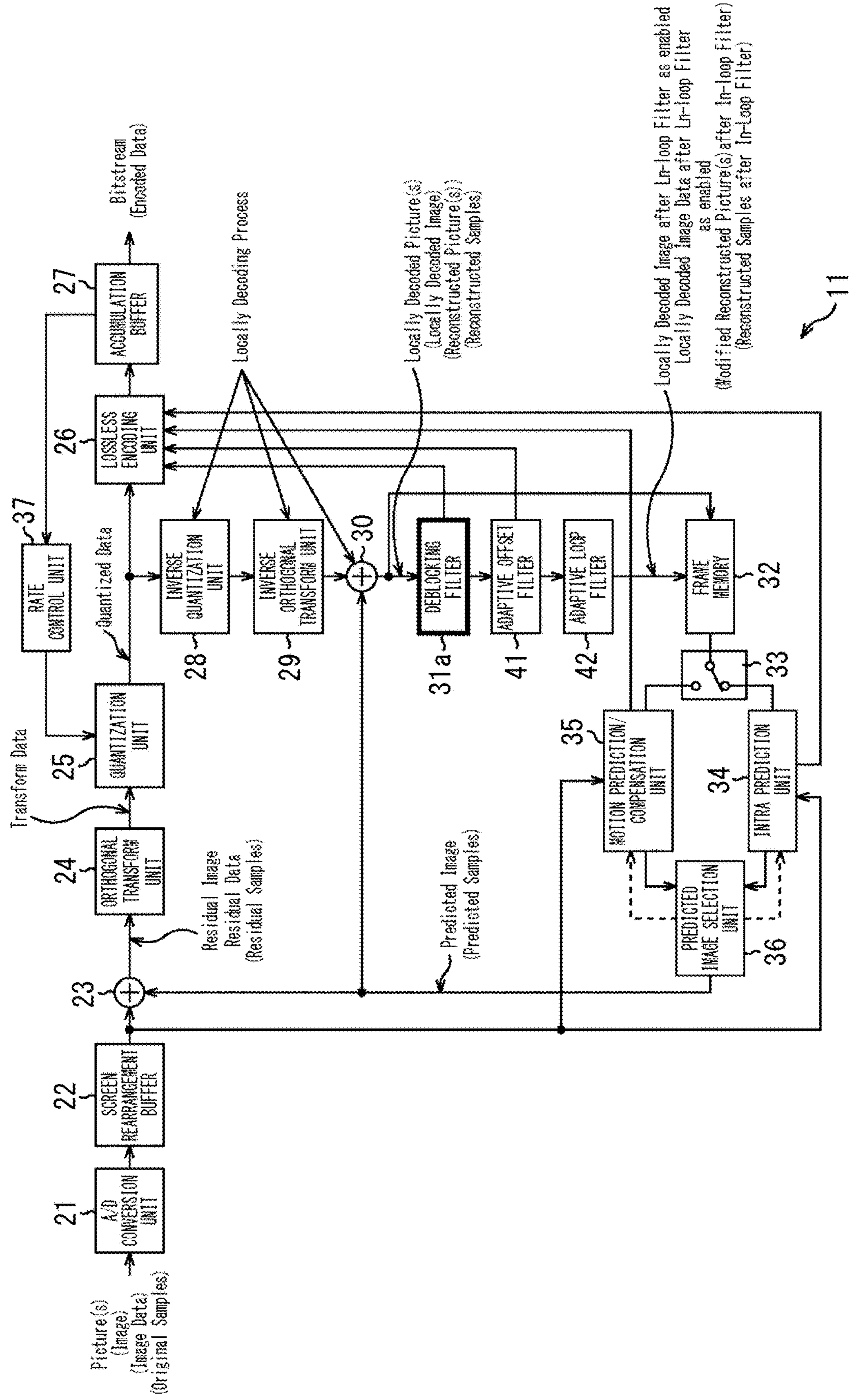
FIG. 8 is a block diagram illustrating a detailed configuration example of an encoder 11.

FIG. 8 is a block diagram illustrating a detailed configuration example of the encoder 11 of FIG. 7.

Note that, in the block diagram described below, lines for supplying information (data) necessary for a process for each block are omitted as appropriate to avoid complicating the drawing.

In FIG. 8, the encoder 11 includes an A/D conversion unit 21, a screen rearrangement buffer 22, a calculation unit 23, an orthogonal transform unit 24, a quantization unit 25, a lossless encoding unit 26, and an accumulation buffer 27. Moreover, the encoder 11 includes an inverse quantization unit 28, an inverse orthogonal transform unit 29, a calculation unit 30, a frame memory 32, a selection unit 33, an intra prediction unit 34, a motion prediction/compensation unit 35, a predicted image selection unit 36, and a rate control unit 37. Furthermore, the encoder 11 includes a deblocking filter 31*a*, an adaptive offset filter 41, and an adaptive loop filter (ALF) 42.

The A/D conversion unit 21 performs A/D conversion of an original image of an analog signal (encoding target) into an original image of a digital signal, and supplies the original image to the screen rearrangement buffer 22 for storage. Note that, in a case where the original image of the digital signal is supplied to the encoder 11, the encoder 11 can be configured without being provided with the A/D conversion unit 21.

The screen rearrangement buffer 22 rearranges frames of the original image into the encoding (decoding) order from the display order depending on a Group Of Picture (GOP), and supplies the frames to the calculation unit 23, the intra prediction unit 34, and the motion prediction/compensation unit 35.

The calculation unit 23 subtracts a predicted image supplied from the intra prediction unit 34 or the motion prediction/compensation unit 35 via the predicted image selection unit 36 from the original image from the screen rearrangement buffer 22, and supplies a residual (prediction residual) obtained by the subtraction to the orthogonal transform unit 24.

The orthogonal transform unit 24 performs an orthogonal transform such as a discrete cosine transform or a Karhunen-Loeve transform on the residual supplied from the calculation unit 23, and supplies orthogonal transform coefficients obtained by the orthogonal transform to the quantization unit 25.

The quantization unit 25 quantizes the orthogonal transform coefficients supplied from the orthogonal transform unit 24. The quantization unit 25 sets a quantization parameter on the basis of a target value of the code amount (code amount target value) supplied from the rate control unit 37, and quantizes the orthogonal transform coefficients. The quantization unit 25 supplies coded data that is the quantized orthogonal transform coefficients to the lossless encoding unit 26.

The lossless encoding unit 26 encodes the quantized orthogonal transform coefficients as coded data from the quantization unit 25 with a predetermined lossless encoding method.

Furthermore, the lossless encoding unit 26 acquires, from each block, encoding information necessary for decoding by the decoding device 170 out of encoding information regarding predictive encoding by the encoder 11.

Here, the encoding information includes, for example, a prediction mode of intra prediction or inter-prediction, motion information such as a motion vector, the code amount target value, the quantization parameter, a picture type (I, P, B), filter parameters of the deblocking filter 31*a* and the adaptive offset filter 41, and the like.

The prediction mode can be acquired from the intra prediction unit 34 or the motion prediction/compensation unit 35. The motion information can be acquired from the motion prediction/compensation unit 35. The filter parameters of the deblocking filter 31*a* and the adaptive offset filter 41 can be acquired from the deblocking filter 31*a* and the adaptive offset filter 41, respectively.

The lossless encoding unit 26 encodes the encoding information with a lossless encoding method, for example, variable-length encoding or arithmetic encoding such as Context-Adaptive Variable Length Coding (CAVLC) or Context-Adaptive Binary Arithmetic Coding (CABAC), or others, generates a (multiplexed) encoded bitstream including the encoding information after encoding, and the coded data from the quantization unit 25, and supplies the encoded bitstream to the accumulation buffer 27.

The accumulation buffer 27 temporarily stores the encoded bitstream supplied from the lossless encoding unit 26. The encoded bitstream accumulated in the accumulation buffer 27 is read and transmitted at a predetermined timing.

The coded data that is the orthogonal transform coefficients quantized by the quantization unit 25 is supplied to the lossless encoding unit 26 and also to the inverse quantization unit 28. The inverse quantization unit 28 performs inverse quantization on the quantized orthogonal transform coefficients with a method corresponding to the quantization by the quantization unit 25, and supplies the orthogonal transform coefficients obtained by the inverse quantization to the inverse orthogonal transform unit 29.

The inverse orthogonal transform unit 29 performs inverse orthogonal transform on the orthogonal transform coefficients supplied from the inverse quantization unit 28 with a method corresponding to an orthogonal transform process performed by the orthogonal transform unit 24, and supplies a residual obtained as a result of the inverse orthogonal transform to the calculation unit 30.

The calculation unit 30 adds the predicted image supplied from the intra prediction unit 34 or the motion prediction/compensation unit 35 via the predicted image selection unit 36 to the residual supplied from the inverse orthogonal transform unit 29, and therefore obtains and outputs (a part of) a decoded image obtained by decoding the original image.

The decoded image output by the calculation unit 30 is supplied to the deblocking filter 31*a* or the frame memory 32.

The frame memory 32 temporarily stores the decoded image supplied from the calculation unit 30, and a decoded image (filter image) to which the deblocking filter 31*a*, the adaptive offset filter 41, and the ALF 42 are applied, supplied from the ALF 42. The decoded image stored in the frame memory 32 is supplied to the selection unit 33 at a necessary timing, as a reference image used for generating the predicted image.

The selection unit 33 selects a supply destination of the reference image supplied from the frame memory 32. In a case where the intra prediction is performed in the intra prediction unit 34, the selection unit 33 supplies the reference image supplied from the frame memory 32 to the intra prediction unit 34. In a case where inter-prediction is performed in the motion prediction/compensation unit 35, the selection unit 33 supplies the reference image supplied from the frame memory 32 to the motion prediction/compensation unit 35.

The intra prediction unit 34 performs intra prediction (in-screen prediction) using the original image supplied from the screen rearrangement buffer 22 and the reference image supplied from the frame memory 32 via the selection unit 33. The intra prediction unit 34 selects an optimal intra prediction mode on the basis of a predetermined cost function (for example, RD cost, or the like), and supplies a predicted image generated from the reference image in the optimal intra prediction mode to the predicted image selection unit 36. Furthermore, as described above, the intra prediction unit 34 appropriately supplies the prediction mode indicating the intra prediction mode selected on the basis of the cost function to the lossless encoding unit 26 and the like.

The motion prediction/compensation unit 35 performs motion prediction (inter-prediction) using the original image supplied from the screen rearrangement buffer 22, and the reference image supplied from the frame memory 32 via the selection unit 33. Moreover, the motion prediction/compensation unit 35 performs motion compensation depending on the motion vector detected by the motion prediction, to generate the predicted image. The motion prediction/compensation unit 35 performs inter-prediction in a plurality of inter-prediction modes prepared in advance, to generate a predicted image from the reference image.

The motion prediction/compensation unit 35 selects an optimal inter-prediction mode on the basis of a predetermined cost function of the predicted image obtained for each of the plurality of inter-prediction modes. Moreover, the motion prediction/compensation unit 35 supplies the predicted image generated in the optimal inter-prediction mode to the predicted image selection unit 36.

Furthermore, the motion prediction/compensation unit 35 supplies, to the lossless encoding unit 26, a prediction mode indicating the inter-prediction mode selected on the basis of the cost function, and motion information such as a motion vector required in decoding of the coded data encoded in the inter-prediction mode, and the like.

The predicted image selection unit 36 selects a supply source of the predicted image to be supplied to the calculation units 23 and 30 from the intra prediction unit 34 and the motion prediction/compensation unit 35, and supplies the predicted image supplied from the selected supply source to the calculation units 23 and 30.

The rate control unit 37 controls a rate of quantization operation in the quantization unit 25 on the basis of the code amount of the encoded bitstream accumulated in the accumulation buffer 27 so that overflow or underflow does not occur. That is, the rate control unit 37 sets a target code amount of the encoded bitstream not to cause overflow and underflow of the accumulation buffer 27, and supplies the target code amount to the quantization unit 25.

The deblocking filter 31*a* applies the deblocking filter to the decoded image from the calculation unit 30 as necessary, and supplies, to the adaptive offset filter 41, the decoded image (filter image) to which the deblocking filter is applied, or the decoded image to which the deblocking filter is not applied.

The adaptive offset filter 41 applies the adaptive offset filter to the decoded image from the deblocking filter 31*a* as necessary, and supplies, to the ALF 42, the decoded image (filter image) to which the adaptive offset filter is applied, or the decoded image to which the adaptive offset filter is not applied.

The ALF 42 applies ALF to the decoded image from the adaptive offset filter 41 as necessary, and supplies, to the frame memory 32, the decoded image to which the ALF is applied or the decoded image to which the ALF is not applied.

<Encoding Process>

Figure 9:
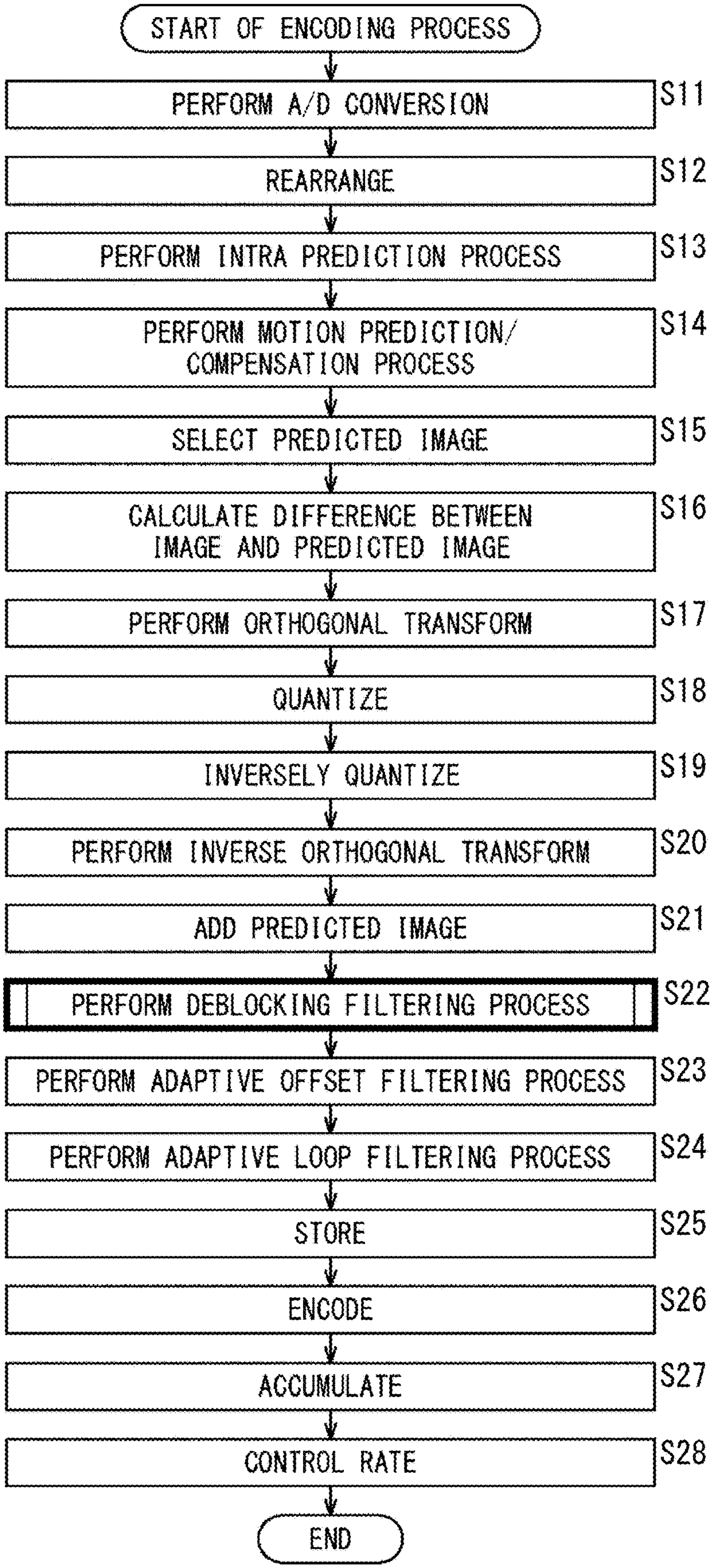
FIG. 9 is a flowchart explaining an example of an encoding process by the encoder 11.

FIG. 9 is a flowchart explaining an example of an encoding process by the encoder 11 in FIG. 8.

Note that, the order of the steps of the encoding process illustrated in FIG. 9 is an order for convenience of description, and the steps of the actual encoding process are appropriately performed in parallel and in a necessary order. The same applies to processes described later.

In the encoder 11, in step S11, the A/D conversion unit 21 performs A/D conversion on the original image and supplies the converted original image to the screen rearrangement buffer 22, and the process proceeds to step S12.

In step S12, the screen rearrangement buffer 22 stores the original image from the A/D conversion unit 21 and performs rearrangement in the encoding order to output the original image, and the process proceeds to step S13.

In step S13, the intra prediction unit 34 performs an intra prediction process in the intra prediction mode, and the process proceeds to step S14. In step S14, the motion prediction/compensation unit 35 performs inter-motion prediction process of performing motion prediction and motion compensation in the inter-prediction mode, and the process proceeds to step S15.

In the intra prediction process by the intra prediction unit 34 and the inter-motion prediction process by the motion prediction/compensation unit 35, cost functions of various prediction modes are calculated, and a predicted image is generated.

In step 515, the predicted image selection unit 36 determines an optimal prediction mode on the basis of each cost function obtained by the intra prediction unit 34 and the motion prediction/compensation unit 35. Then, the predicted image selection unit 36 selects and outputs a predicted image in the optimal prediction mode from the predicted image generated by the intra prediction unit 34 and the predicted image generated by the motion prediction/compensation unit 35, and the process proceeds from step S15 to step 516.

In step 516, the calculation unit 23 calculates a residual between a target image to be encoded that is the original image output from the screen rearrangement buffer 22, and the predicted image output from the predicted image selection unit 36, and supplies the residual to the orthogonal transform unit 24, and the process proceeds to step 517.

In step 517, the orthogonal transform unit 24 performs orthogonal transform on the residual from the calculation unit 23, and supplies orthogonal transform coefficients obtained as a result of the orthogonal transform, to the quantization unit 25, and the process proceeds to step 518.

In step 518, the quantization unit 25 quantizes the orthogonal transform coefficients from the orthogonal transform unit 24, and supplies quantization coefficients obtained by the quantization to the lossless encoding unit 26 and the inverse quantization unit 28, and the process proceeds to step 519.

In step 519, the inverse quantization unit 28 performs inverse quantization on the quantization coefficients from the quantization unit 25, and supplies orthogonal transform coefficients obtained as a result of the inverse quantization, to the inverse orthogonal transform unit 29, and the process proceeds to step 520. In step S20, the inverse orthogonal transform unit 29 performs inverse orthogonal transform on the orthogonal transform coefficients from the inverse quantization unit 28, and supplies a residual obtained as a result of the inverse orthogonal transform, to the calculation unit 30, and the process proceeds to step S21.

In step S21, the calculation unit 30 adds the residual from the inverse orthogonal transform unit 29 and the predicted image output from the predicted image selection unit 36 together, to generate a decoded image corresponding to the original image subjected to residual calculation in the calculation unit 23. The calculation unit 30 supplies the decoded image to the deblocking filter 31*a*, and the process proceeds from step S21 to step S22.

In step S22, the deblocking filter 31*a* applies the deblocking filter to the decoded image from the calculation unit 30, supplies a filter image obtained as a result of the application, to the adaptive offset filter 41, and the process proceeds to step S23.

In step S23, the adaptive offset filter 41 applies the adaptive offset filter to the filter image from the deblocking filter 31*a*, supplies a filter image obtained as a result of the application, to the ALF 42, and the process proceeds to step S24.

In step S24, the ALF 42 applies the ALF to the filter image from the adaptive offset filter 41, supplies a filter image obtained as a result of the application, to the frame memory 32, and the process proceeds to step S25.

In step S25, the frame memory 32 stores the filter image supplied from the ALF 42, and the process proceeds to step S26. The filter image stored in the frame memory 32 is used as a reference image that is a source for generating the predicted image, in steps S13 and S14.

In step S26, the lossless encoding unit 26 encodes the coded data that is the quantization coefficients from the quantization unit 25, and generates an encoded bitstream including the coded data. Moreover, the lossless encoding unit 26 encodes encoding information as necessary, such as the quantization parameter used for quantization in the quantization unit 25, the prediction mode obtained in the intra prediction process in the intra prediction unit 34, the prediction mode and motion information obtained in the inter-motion prediction process in the motion prediction/compensation unit 35, and the filter parameters of the deblocking filter 31*a* and the adaptive offset filter 41, and includes the encoding information in the encoded bitstream.

Then, the lossless encoding unit 26 supplies the encoded bitstream to the accumulation buffer 27, and the process proceeds from step S26 to step S27.

In step S27, the accumulation buffer 27 accumulates the encoded bitstream from the lossless encoding unit 26, and the process proceeds to step S28. The encoded bitstream accumulated in the accumulation buffer 27 is appropriately read and transmitted.

In step S28, the rate control unit 37 controls the rate of the quantization operation in the quantization unit 25 on the basis of the code amount (generated code amount) of the encoded bitstream accumulated in the accumulation buffer 27 so that overflow or underflow does not occur, and the encoding process ends.

Configuration Example of Decoder 51

Figure 10:
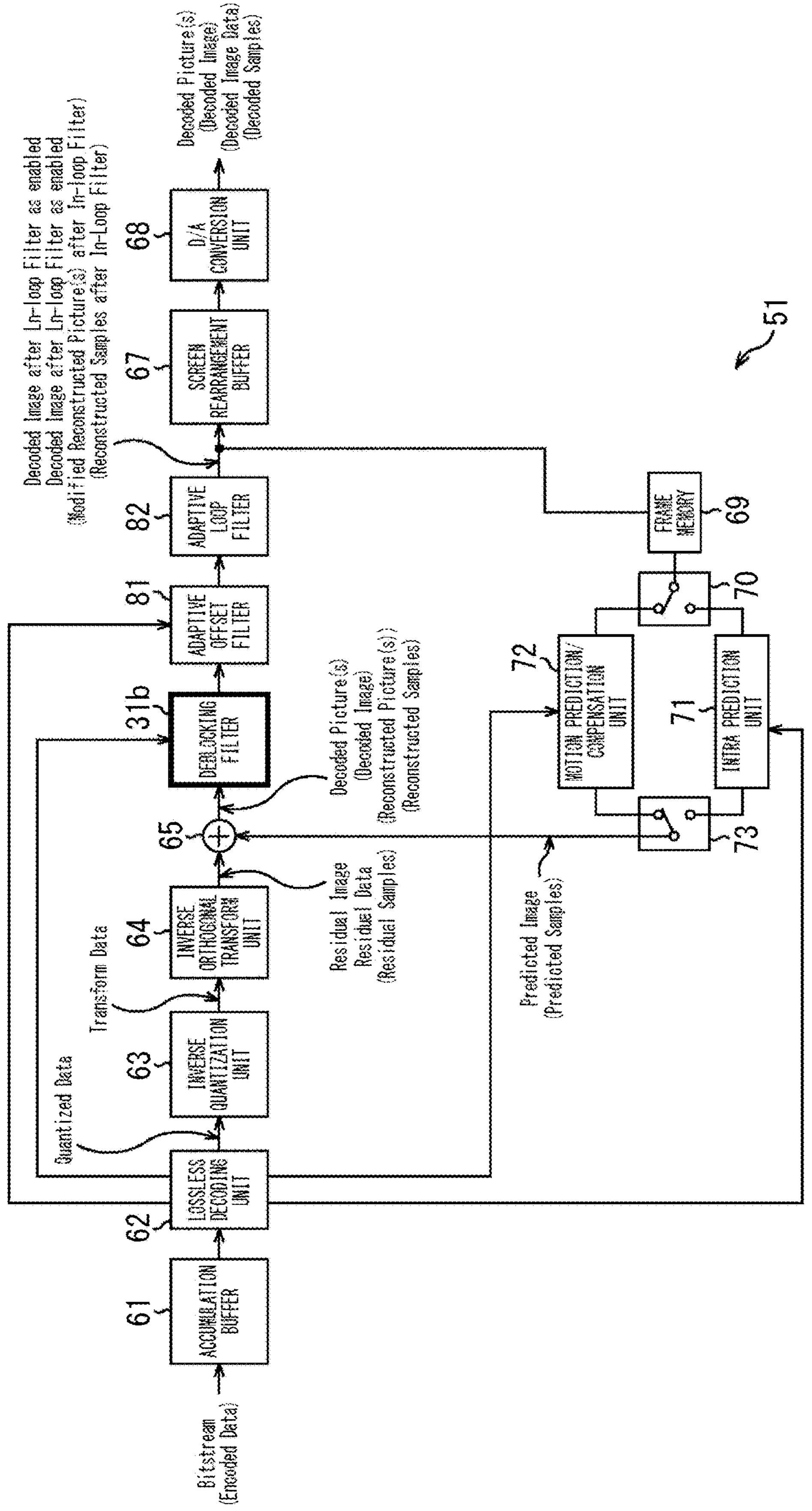
FIG. 10 is a block diagram illustrating a detailed configuration example of a decoder 51.

FIG. 10 is a block diagram illustrating a detailed configuration example of the decoder 51 of FIG. 7.

In FIG. 10, the decoder 51 includes an accumulation buffer 61, a lossless decoding unit 62, an inverse quantization unit 63, an inverse orthogonal transform unit 64, a calculation unit 65, a screen rearrangement buffer 67, and a D/A conversion unit 68. Moreover, the decoder 51 includes a frame memory 69, a selection unit 70, an intra prediction unit 71, a motion prediction/compensation unit 72, and a selection unit 73. Furthermore, the decoder 51 includes a deblocking filter 31*b*, an adaptive offset filter 81, and an ALF 82.

The accumulation buffer 61 temporarily accumulates an encoded bitstream transmitted from the encoder 11, and supplies the encoded bitstream to the lossless decoding unit 62 at a predetermined timing.

The lossless decoding unit 62 receives the encoded bitstream from the accumulation buffer 61, and decodes the encoded bitstream with a method corresponding to the encoding method of the lossless encoding unit 26 in FIG. 8.

Then, the lossless decoding unit 62 supplies quantization coefficients as coded data included in a decoding result of the encoded bitstream to the inverse quantization unit 63.

Furthermore, the lossless decoding unit 62 has a function of performing parsing. The lossless decoding unit 62 parses the necessary encoding information included in the decoding result of the encoded bitstream, and supplies the encoding information to the intra prediction unit 71, the motion prediction/compensation unit 72, the deblocking filter 31*b*, the adaptive offset filter 81, and other necessary blocks.

The inverse quantization unit 63 performs inverse quantization on the quantization coefficients as the coded data from the lossless decoding unit 62 with a method corresponding to the quantization method of the quantization unit 25 in FIG. 8, and supplies orthogonal transform coefficients obtained by the inverse quantization to the inverse orthogonal transform unit 64.

The inverse orthogonal transform unit 64 performs inverse orthogonal transform on the orthogonal transform coefficients supplied from the inverse quantization unit 63 with a method corresponding to the orthogonal transform method of the orthogonal transform unit 24 in FIG. 8, and supplies a residual obtained as a result of the inverse orthogonal transform, to the calculation unit 65.

To the calculation unit 65, the residual is supplied from the inverse orthogonal transform unit 64, and also a predicted image is supplied from the intra prediction unit 71 or the motion prediction/compensation unit 72 via the selection unit 73.

The calculation unit 65 adds the residual from the inverse orthogonal transform unit 64 and the predicted image from the selection unit 73 together, to generate a decoded image, and supplies the decoded image to the deblocking filter 31*b*.

The screen rearrangement buffer 67 temporarily stores the decoded image supplied from the ALF 82, rearranges frames (pictures) of the decoded image into the display order from the encoding (decoding) order, and supplies the frames to the D/A conversion unit 68.

The D/A conversion unit 68 performs D/A conversion on the decoded image supplied from the screen rearrangement buffer 67, and outputs the converted decoded image to a display (not illustrated) for display. Note that, in a case where a device connected to the decoder 51 accepts an image of a digital signal, the decoder 51 can be configured without being provided with the D/A conversion unit 68.

The frame memory 69 temporarily stores the decoded image supplied from the ALF 82. Moreover, the frame memory 69 supplies, to the selection unit 70, the decoded image as a reference image to be used for generating the predicted image, at a predetermined timing or on the basis of an external request from the intra prediction unit 71, the motion prediction/compensation unit 72, or the like.

The selection unit 70 selects a supply destination of the reference image supplied from the frame memory 69. In a case where an image encoded in the intra prediction is decoded, the selection unit 70 supplies the reference image supplied from the frame memory 69 to the intra prediction unit 71. Furthermore, in a case where an image encoded in the inter-prediction is decoded, the selection unit 70 supplies the reference image supplied from the frame memory 69 to the motion prediction/compensation unit 72.

In accordance with the prediction mode included in the encoding information supplied from the lossless decoding unit 62, in the intra prediction mode used in the intra prediction unit 34 in FIG. 8, the intra prediction unit 71 performs intra prediction by using the reference image supplied via the selection unit 70 from the frame memory 69. Then, the intra prediction unit 71 supplies the predicted image obtained by the intra prediction to the selection unit 73.

In accordance with the prediction mode included in the encoding information supplied from the lossless decoding unit 62, in the inter-prediction mode used in the motion prediction/compensation unit 35 in FIG. 8, the motion prediction/compensation unit 72 performs inter-prediction by using the reference image supplied via the selection unit 70 from the frame memory 69. The inter-prediction is performed using the motion information and the like included in the encoding information supplied from the lossless decoding unit 62, as necessary.

The motion prediction/compensation unit 72 supplies the predicted image obtained by the inter-prediction to the selection unit 73.

The selection unit 73 selects the predicted image supplied from the intra prediction unit 71 or the predicted image supplied from the motion prediction/compensation unit 72, and supplies the selected predicted image to the calculation unit 65.

The deblocking filter 31*b* applies the deblocking filter to the decoded image from the calculation unit 65 in accordance with the filter parameters included in the encoding information supplied from the lossless decoding unit 62. The deblocking filter 31*b* supplies, to the adaptive offset filter 81, the decoded image (filter image) to which the deblocking filter is applied or the decoded image to which the deblocking filter is not applied.

The adaptive offset filter 81 applies the adaptive offset filter to the decoded image from the deblocking filter 31*b* as necessary in accordance with the filter parameters included in the encoding information supplied from the lossless decoding unit 62. The adaptive concave set filter 81 supplies, to the ALF 82, the decoded image (filter image) to which the adaptive offset filter is applied or the decoded image to which the adaptive offset filter is not applied.

The ALF 82 applies the ALF to the decoded image from the adaptive offset filter 81 as necessary, and supplies the decoded image to which the ALF is applied or the decoded image to which the ALF is not applied, to the screen rearrangement buffer 67 and the frame memory 69.

<Decoding Process>

Figure 11:
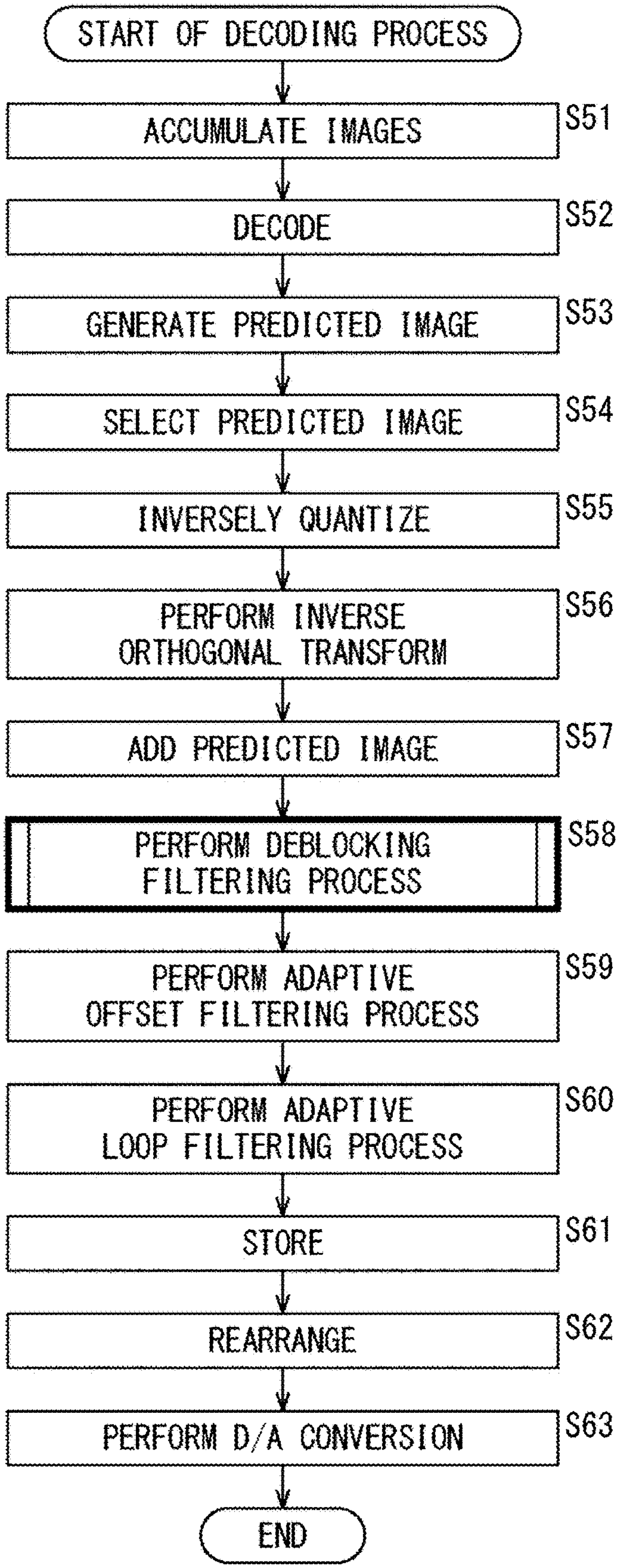
FIG. 11 is a flowchart explaining an example of a decoding process by the decoder 51.

FIG. 11 is a flowchart explaining an example of a decoding process by the decoder 51 of FIG. 10.

In the decoding process, in step S51, the accumulation buffer 61 temporarily accumulates an encoded bitstream transmitted from the encoder 11, and appropriately supplies the encoded bitstream to the lossless decoding unit 62, and the process proceeds to step S52.

In step S52, the lossless decoding unit 62 receives and decodes the encoded bitstream supplied from the accumulation buffer 61, and supplies the quantization coefficients as the coded data included in the decoding result of the encoded bitstream to the inverse quantization unit 63.

Furthermore, the lossless decoding unit 62 parses the encoding information included in the decoding result of the encoded bitstream. Then, the lossless decoding unit 62 supplies the necessary encoding information to the intra prediction unit 71, the motion prediction/compensation unit 72, the deblocking filter 31*b*, the adaptive offset filter 81, and other necessary blocks.

Then, the process proceeds from step S52 to step S53, and the intra prediction unit 71 or the motion prediction/compensation unit 72 performs intra prediction process or inter-motion prediction process of generating a predicted image, in accordance with the reference image supplied via the selection unit 70 from the frame memory 69, and the encoding information supplied from the lossless decoding unit 62. Then, the intra prediction unit 71 or the motion prediction/compensation unit 72 supplies the predicted image obtained by the intra prediction process or the inter-motion prediction process to the selection unit 73, and the process proceeds from step S53 to step S54.

In step S54, the selection unit 73 selects the predicted image supplied from the intra prediction unit 71 or the motion prediction/compensation unit 72, and supplies the predicted image to the calculation unit 65, and the process proceeds to step S55.

In step S55, the inverse quantization unit 63 performs inverse quantization on the quantization coefficients from the lossless decoding unit 62, and supplies orthogonal transform coefficients obtained as a result of the inverse quantization, to the inverse orthogonal transform unit 64, and the process proceeds to step S56.

In step S56, the inverse orthogonal transform unit 64 performs inverse orthogonal transform on the orthogonal transform coefficients from the inverse quantization unit 63, and supplies a residual obtained as a result of the inverse orthogonal transform, to the calculation unit 65, and the process proceeds to step S57.

In step S57, the calculation unit 65 generates a decoded image by adding the residual from the inverse orthogonal transform unit 64 and the predicted image from the selection unit 73 together. Then, the calculation unit 65 supplies the decoded image to the deblocking filter 31*b*, and the process proceeds from step S57 to step S58.

In step S58, the deblocking filter 31*b* applies the deblocking filter to the decoded image from the calculation unit 65 in accordance with the filter parameters included in the encoding information supplied from the lossless decoding unit 62. The deblocking filter 31B supplies, to the adaptive offset filter 81, the filter image obtained as a result of application of the deblocking filter, and the process proceeds from step S58 to step S59.

In step S59, the adaptive offset filter 81 applies the adaptive offset filter to the filter image from the deblocking filter 31*b* in accordance with the filter parameters included in the encoding information supplied from the lossless decoding unit 62. The adaptive offset filter 81 supplies, to the ALF 82, the filter image obtained as a result of application of the adaptive offset filter, and the process proceeds from step S59 to step S60.

The ALF 82 applies the ALF to the filter image from the adaptive offset filter 81, and supplies the filter image obtained as a result of the application, to the screen rearrangement buffer 67 and the frame memory 69, and the process proceeds to step S61.

In step S61, the frame memory 69 temporarily stores the filter image supplied from the ALF 82, and the process proceeds to step S62. The filter image (decoded image) stored in the frame memory 69 is used as a reference image that is a source for generating the predicted image, in the intra prediction process or the inter-motion prediction process in step S53.

In step S62, the screen rearrangement buffer 67 performs rearrangement of the filter image supplied from the ALF 82 in the display order, and supplies the filter image to the D/A conversion unit 68, and the process proceeds to step S63.

In step S63, the D/A conversion unit 68 performs D/A conversion on the filter image from the screen rearrangement buffer 67, and the process, the decoding process, ends. The filter image (decoded image) after the D/A conversion is output and displayed on a display (not illustrated).

Configuration Example of Deblocking Filter 31*a*

Figure 12:
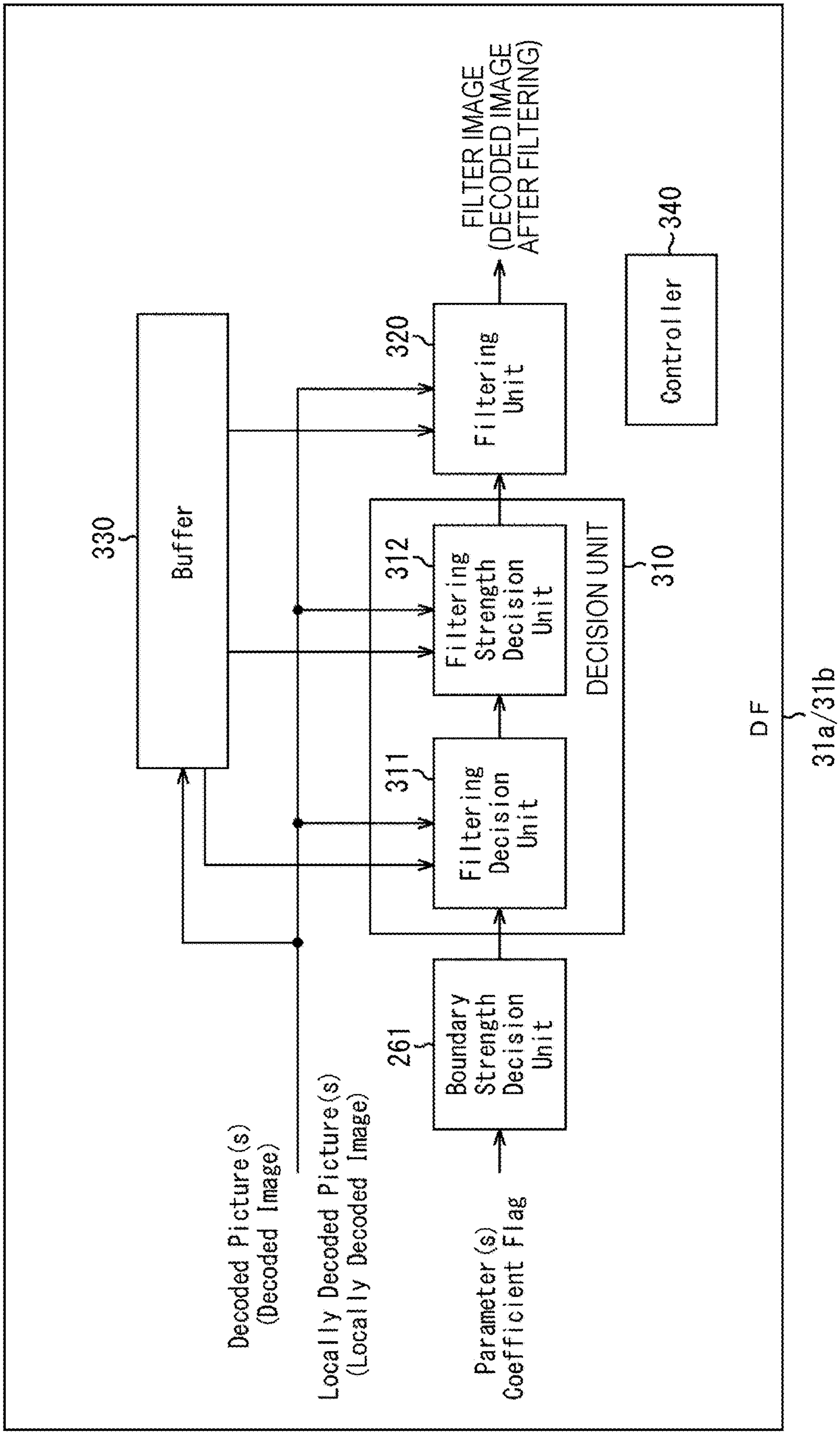
FIG. 12 is a block diagram illustrating a configuration example of a deblocking filter (DF) 31*a*.

FIG. 12 is a block diagram illustrating a configuration example of the deblocking filter (DF) 31*a*.

Note that, the deblocking filter 31*b* is configured similarly to the deblocking filter 31*a*.

In FIG. 12, the deblocking filter 31*a* includes a boundary strength decision unit 261, a decision unit 310, a filtering unit 320, a line buffer 330, and a controller 340.

The boundary strength decision unit 261 targets the block boundary of the decoded image, and sets bS (boundary strength) depending on characteristics of the adjacent block adjacent to the block boundary.

Regarding the luminance component of the decoded image, with the block boundary corresponding to four lines orthogonal to the block boundary as a partial block boundary, the boundary strength decision unit 261 sets bS at the partial block boundary. Furthermore, regarding the color difference component of the decoded image, for example, in a case where a signal in the YUV420 format is a setting target of the bS, with the block boundary corresponding to two lines of the color difference component corresponding to the four lines of the luminance component as a partial block boundary, the boundary strength decision unit 261 sets bS at the partial block boundary.

The bS is set, for example, by using pixel-related parameters related to pixels in the adjacent block as parameters representing the characteristics of the adjacent block adjacent to the partial block boundary.

The pixel-related parameters include luminance-related parameters and color difference-related parameters.

The luminance-related parameters and the color difference-related parameters mean all the parameters related to the luminance and the color difference, respectively. For example, the luminance-related parameters and the color difference-related parameters may respectively include orthogonal transform coefficients (quantization coefficients) of the luminance component and the color difference component included in the Transform Unit (TU), Prediction Unit (PU), Coding Unit (CU), and any other blocks. Moreover, the luminance-related parameters and the color difference-related parameters may respectively include information regarding the orthogonal transform coefficients of the luminance component and the color difference component such as a flag indicating the presence or absence of a significant coefficient (non-zero orthogonal transform coefficient) of the luminance component and the color difference component in each block. The luminance-related parameters and the color difference-related parameters are not limited to such examples, and may be various parameters related to luminance and color difference, respectively.

The pixel-related parameters used by the boundary strength decision unit 261 to set the bS include a flag or the like indicating the presence or absence of significant coefficient of each of the luminance component and the color difference component (U and V) in a block whose block boundary is located on a grid, and the like. Such pixel-related parameters are supplied to the boundary strength decision unit 261 from the controller 340.

In addition, information such as whether or not the adjacent block is set in the ISP and the block size of the sub-blocks obtained by dividing the adjacent block set in the ISP is supplied from the controller 340 to the boundary strength decision unit 261 as parameters representing the characteristics of the adjacent block.

The boundary strength decision unit 261 sets the bS depending on the parameters representing the characteristics of the adjacent block from the controller 340, and the like. The boundary strength decision unit 261 supplies the bS to the decision unit 310.

Note that, as the method of setting the bS, for example, the method described in the reference document REF4 or any other method can be adopted. Furthermore, as the bS, any value representing the boundary strength can be adopted. Here, as the bS, values 0, 1, and 2 that divide the boundary strength into three stages are adopted, and the stronger the boundary strength, the larger the value of the bS.

The decision unit 310 includes a filtering decision unit 311 and a filtering strength decision unit 312, and performs filtering decision.

The bS is supplied from the boundary strength decision unit 261 to the filtering decision unit 311. Furthermore, the decoded image is supplied to the filtering decision unit 311 from the outside of the deblocking filter 31*a* (the calculation unit 30 in FIG. 8 or the calculation unit 65 in FIG. 10) or the line buffer 330.

The filtering decision unit 311 performs the application necessity decision using the bS from the boundary strength decision unit 261 and, further, using the decoded image from the outside of the deblocking filter 31*a* or the line buffer 330, and the like.

The filtering decision unit 311 supplies the decision result of the application necessity decision to the filtering strength decision unit 312.

To the filtering strength decision unit 312, the decision result of the application necessity decision is supplied from the filtering decision unit 311, and also the decoded image is supplied from the outside of the deblocking filter 31*a* or the line buffer 330.

In a case where the decision result of the application necessity decision from the filtering decision unit 311 indicates that the deblocking filter is applied, the filtering strength decision unit 312 performs the filtering strength decision for deciding the filtering strength of the deblocking filter applied to the decoded image by using the decoded image from the outside of the deblocking filter 31*a* or the line buffer 330. Then, the filtering strength decision unit 312 supplies the decision result of the filtering strength decision to the filtering unit 320 as the decision result of the filtering decision.

In the deblocking filter 31*a*, in a case where there are three filter types of the deblocking filter applied to the decoded image, for example, a weak filter, a strong filter, and a long filter, the decision result of the filtering strength represents the weak filter, the strong filter, and the long filter.

Here, the strong filter is a filter having a larger number of taps and a stronger filtering strength than the weak filter. The long filter is a filter having a larger number of taps and a stronger filtering strength than the strong filter.

Furthermore, in a case where the decision result of the application necessity decision from the filtering decision unit 311 indicates that the deblocking filter is not applied, the filtering strength decision unit 312 supplies the decision result of the application necessity decision to the filtering unit 320 as the decision result of the filtering decision.

To the filtering unit 320, the decision result of the filtering decision is supplied from the filtering strength decision unit 312, and also the decoded image is supplied from the outside of the deblocking filter 31*a* or the line buffer 330.

In a case where the decision result of the filtering decision from (the filtering strength decision unit 312 of) the decision unit 310 indicates that the deblocking filter is not applied, the filtering unit 320 outputs the decoded image as it is without applying the deblocking filter to the decoded image.

Furthermore, in a case where the decision result of the filtering decision from the filtering strength decision unit 312 indicates the filter type (here, the weak filter, the strong filter, or the long filter), the filtering unit 320 performs a filtering process of applying the deblocking filter of the filter type indicated by the decision result of the filtering decision to the decoded image.

That is, the filtering unit 320 performs filter calculation as the filtering process for the application target pixels that are pixels to be subjected to the filtering process, in the decoded image from the outside of the deblocking filter 31*a* or the line buffer 330, by using pixels in the vicinity of the application target pixels.

The filtering unit 320 outputs pixel values obtained by the filtering process of the application target pixels as pixel values of filter pixels constituting the filter image (decoded image after the filtering process) obtained by applying the deblocking filter to the decoded image.

A decoded image is supplied to the line buffer 330 from the outside of the deblocking filter 31*a*. The line buffer 330 appropriately stores (pixel values of) the decoded image from the outside of the deblocking filter 31*a*. Note that, the line buffer 330 has a storage capacity for storing pixel values for a predetermined number of lines (number of rows), and when the pixel values for the storage capacity are stored, a new pixel value is stored in the form of being overwritten on the oldest pixel value.

Here, it is assumed that the deblocking filter 31*a* processes, for example, the decoded image in the order of raster scan.

In the deblocking filter 31*a*, for example, the process is performed in units of blocks in which the TU, PU, and CU are unified. In the deblocking filter 31*a*, for example, a plurality of blocks such as those for one line can be processed in the order of raster scan, and can also be processed in parallel.

The decision unit 310 and the filtering unit 320 include a built-in internal buffer having a capacity capable of storing pixel values of a line in the horizontal direction included in a target block that is a block to be processed by the deblocking filter 31*a*. The decision unit 310 and the filtering unit 320 store the pixel values of the line in the horizontal direction included in the target block in the internal buffer, and use the pixel values stored in the internal buffer as necessary to process the target block.

In a case where the deblocking filter 31*a* is applied to the horizontal block boundary on the upper side of the target block, pixel values of pixels in the target block and pixel values of pixels in a block adjacent to the upper side of the target block may be required.

The pixel values of the pixels in the target block are stored in the internal buffer when the target block is processed. On the other hand, since the pixel values of the pixels in the block adjacent to the upper side of the target block are not the pixel values of the pixels in the target block, the values are not stored in the internal buffer when the target block is processed.

Thus, the line buffer 330 stores pixel values of pixels of a line (pixels belonging a line) necessary for applying the deblocking filter 31*a* to the horizontal block boundary on the upper side of the target block among lines in the horizontal direction included in the block adjacent to the upper side of the target block. The pixels of the line necessary for applying the deblocking filter 31*a* are pixels used for the filtering decision and pixels used for the filtering process.

The controller 340 controls each block constituting the deblocking filter 31*a*. Furthermore, the controller 340 acquires parameters and the like necessary for setting the bS by performing generation or the like, and supplies the parameters to the boundary strength decision unit 261.

Note that, in the present embodiment, it is assumed that the deblocking filter 31*a* processes, for example, the decoded images in the order of raster scan. However, the deblocking filter 31*a* can perform the decoded image in an order other than the order of raster scan. For example, the deblocking filter 31*a* can repeat processing the decoded image from top to bottom, from left to right. In this case, the horizontal (lateral) (left and right) and vertical (longitudinal) (up and down) described below are reversed (swapped).

<Method of Setting bS>

FIG. 13 is a diagram illustrating an example of a method of setting bS of the boundary strength decision unit 261.

In FIG. 13, P(p) and Q(q) respectively represent a pixel in one block of two blocks (including sub-blocks) adjacent to a block boundary (including sub-block boundaries), and a pixel in the other block.

According to FIG. 13, the bS is set depending on characteristics of the two blocks (including the sub-blocks) adjacent to the block boundary (including the sub-block boundaries).

For example, according to FIG. 13, in a case where the pixel P in one block of two blocks (adjacent blocks) adjacent to the block boundary or the pixel Q in the other block is a pixel in a block in the intra prediction mode (block subjected to intra prediction), the bS is set to 2.

Furthermore, for example, according to FIG. 13, in a case where the pixel P in one sub-block of two sub-blocks adjacent to a sub-block boundary (Sub-Partition boundary) of sub-blocks obtained by dividing the block set in the ISP, or the pixel Q in the other sub-block is a pixel in the block in the intra prediction mode, the bS is set to 2.

Thus, according to FIG. 13, as the bS of the sub-block boundary of the sub-blocks obtained by dividing the block set in the ISP, the same 2 is set as the bS set at the block boundary in a case where the block adjacent to the block boundary is a block in the intra prediction mode.

Note that, in a case where the pixel P or Q in the two sub-blocks adjacent to the sub-block boundary of the sub-blocks obtained by dividing the block set in the ISP is the pixel in the block in the intra prediction mode, the bS can be set to 1 instead of 2.

Furthermore, the block set in the ISP is only the block having the luminance component (Y), and the block having the color difference components (U and V) is not set in the ISP.

According to FIG. 13, in a case where the pixel P or Q in the two blocks adjacent to a CU or TU block boundary is a pixel in the block of Combined Intra and Inter Prediction mode (CIPP), the bS is set to 2.

Moreover, according to FIG. 13, in a case where motion vectors MV of the two blocks adjacent to the block boundary are different from each other and in a case where reference images are different from each other, the bS is set to 1. Note that, to set the bS to 1 because the motion vectors MV or the reference images are different from each other is applied only to the block of the luminance component, not to the block of the color difference component.

Furthermore, according to FIG. 13, in a case where one or more significant coefficients (non-zero orthogonal transform coefficients) exist in the block adjacent to the CU or TU block boundary, the bS is set to 1.

Moreover, for example, according to FIG. 13, in a case where the pixel P or Q in the two blocks adjacent to the block boundary is a pixel in the block in the CIPP, the bS is set to 1.

In a case where none of the above applies, the bS is set to 0.

<Process of the Deblocking Filter 31*a*>

Figure 14:
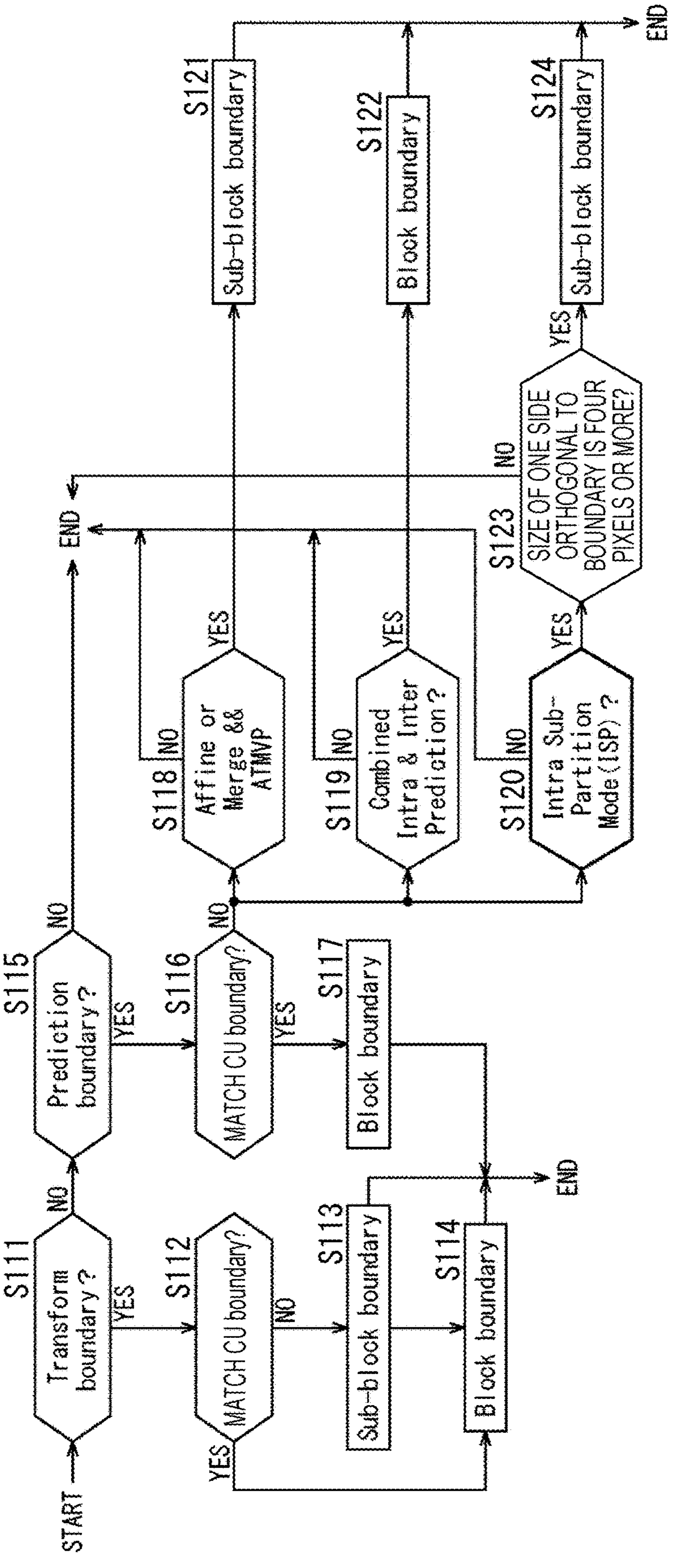
FIG. 14 is a flowchart explaining an example of a block boundary decision process for deciding a block boundary to which the deblocking filter can be applied.

FIG. 14 is a flowchart explaining an example of a block boundary decision process for deciding a block boundary to which the deblocking filter can be applied.

The block boundary decision process is performed in the deblocking filter 31*a* (FIG. 12) before the boundary strength decision unit 261 sets bS.

In step S111, the boundary strength decision unit 261 decides whether or not the partial block boundary, which is a unit of processing when performing filtering decision at the block boundary (including the sub-block boundary) located on a grid, is the TU block boundary.

In a case where it is decided in step S111 that the partial block boundary is the TU block boundary, the process proceeds to step S112, and the boundary strength decision unit 261 decides whether or not the partial block boundary is the CU block boundary.

In a case where it is decided in step S112 that the partial block boundary is not the CU block boundary, the process proceeds to step S113, and the boundary strength decision unit 261 decides that the partial block boundary is the sub-block boundary, and the block boundary decision process ends.

Furthermore, in a case where it is decided in step S112 that the partial block boundary is the CU block boundary, the process proceeds to step S114, and the boundary strength decision unit 261 decides that the partial block boundary is the block boundary, and the block boundary decision process ends.

On the other hand, in a case where it is decided in step S111 that the partial block boundary is not the TU block boundary, the process proceeds to step S115, and the boundary strength decision unit 261 decides whether or not the partial block boundary is the PU block boundary.

In a case where it is decided in step S115 that the partial block boundary is not the PU block boundary, the block boundary decision process ends.

Furthermore, in a case where it is decided in step S115 that the partial block boundary is the PU block boundary, the process proceeds to step S116, and the boundary strength decision unit 261 decides whether or not the partial block boundary is the CU block boundary.

In a case where it is decided in step S116 that the partial block boundary is the CU block boundary, the process proceeds to step S117, and the boundary strength decision unit 261 decides that the partial block boundary is the block boundary, and the block boundary decision process ends.

Furthermore, in a case where it is decided in step S116 that the partial block boundary is not the CU block boundary, the process proceeds to steps S118, S119, and S120.

In step S118, the boundary strength decision unit 261 decides whether or not the prediction mode of the adjacent block adjacent to the partial block boundary is the intra prediction mode, and the inter-prediction mode is affine or merge and is advanced temporal motion vector prediction (ATMVP).

In step S119, the boundary strength decision unit 261 decides whether or not the prediction mode of the adjacent block adjacent to the partial block boundary is the intra prediction mode, and the inter-prediction mode is CIIP.

In step S120, the boundary strength decision unit 261 decides whether or not the adjacent block adjacent to the partial block boundary is set in the ISP.

In a case where decision results of steps S118 to S120 are all false, the block boundary decision process ends.

In a case where the decision result in step S118 is true, the process proceeds to step S121, and the boundary strength decision unit 261 decides that the partial block boundary is the sub-block boundary, and the block boundary decision process ends.

In a case where the decision result in step S119 is true, the process proceeds to step S122, and the boundary strength decision unit 261 decides that the partial block boundary is the block boundary, and the block boundary decision process ends.

In a case where the decision result in step S120 is true, the process proceeds to step S123, and the boundary strength decision unit 261 decides whether or not the size in the direction orthogonal to the partial block boundary of the adjacent block adjacent to the partial block boundary is four pixels or more.

In step S123, in a case where it is decided that the size in the direction orthogonal to the partial block boundary of the adjacent block adjacent to the partial block boundary is not four pixels or more, the block boundary decision process ends.

Furthermore, in a case where it is decided in step S123 that the size in the direction orthogonal to the partial block boundary of the adjacent block adjacent to the partial block boundary is four pixels or more, the process proceeds to step S124. In step S124, the boundary strength decision unit 261 decides that the partial block boundary is the sub-block boundary, and the block boundary decision process ends.

In the block boundary decision process, the deblocking filter is not applied to the partial block boundary that is not decided to be the block boundary or the sub-block boundary, and the subsequent process is not performed in the deblocking filter 31*a*.

On the other hand, for the partial block boundary decided to be the block boundary or the sub-block boundary, it is decided that the deblocking filter can be applied, and setting of the bS, the filtering decision, and the filtering process are performed in the deblocking filter 31*a*.

Figure 15:
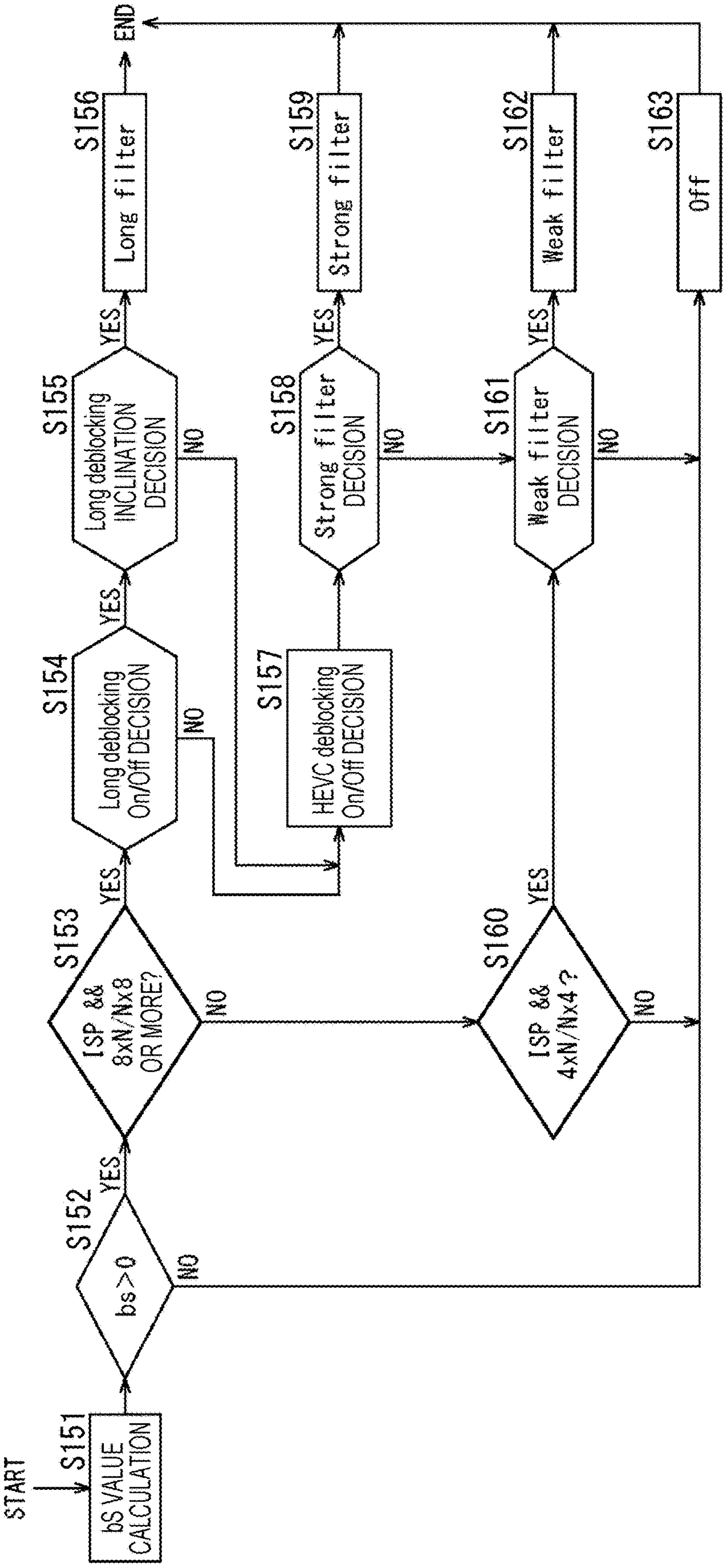
FIG. 15 is a flowchart explaining an example of a process of the deblocking filter 31*a* performed for a partial block boundary decided to be a sub-block boundary in the block boundary decision process.

FIG. 15 is a flowchart explaining an example of a process of the deblocking filter 31*a* performed for the partial block boundary decided to be the sub-block boundary in the block boundary decision process.

In step S151, the boundary strength decision unit 261 sets (calculates) the bS of the partial block boundary decided to be the sub-block boundary in the block boundary decision process in accordance with the setting method described in FIG. 13. The boundary strength decision unit 261 supplies the bS of the partial block boundary to the decision unit 310, and the process proceeds from step S151 to step S152.

In step S152, the decision unit 310 decides whether or not the bS of the partial block boundary is greater than 0 (is 1 or 2), and in a case where it is decided that the bS is not greater than 0, that is, in a case where the bS is 0, the process proceeds to step S163.

Furthermore, in a case where it is decided in step S152 that the bS of the partial block boundary is greater than 0, that is, in a case where the bS is 1 or 2, the process proceeds to step S153.

In step S153, the decision unit 310 decides the block size of the adjacent sub-block adjacent to the partial block boundary among the sub-blocks obtained by dividing the block set in the ISP.

In step S153, in a case where it is decided that the block size of the adjacent sub-block is 8×N or more, or N×8 or more, that is, in a case where the size of the adjacent sub-block in the direction orthogonal to the partial block boundary is eight pixels or more, the process proceeds to step S154.

In step S154, the decision unit 310 performs long deblocking on/off decision.

In a case where a decision result of the long deblocking on/off decision in step S154 is true, the process proceeds to step S155, and the decision unit 310 performs long deblocking inclination decision.

In a case where the long deblocking inclination decision in step S155 is true, the process proceeds to step S156, and the decision unit 310 decides that the long filter is applied and sets application of the long filter. Then, the filtering unit 320 performs a filtering process of applying the long filter to the partial block boundary, and the process ends.

On the other hand, in a case where the decision result of the long deblocking on/off decision in step S154 is false, or the long deblocking inclination decision in step S155 is false, the process proceeds to step S157.

In step S157, the decision unit 310 performs HEVC deblocking on/off decision, and the process proceeds to step S158.

In step S158, the decision unit 310 performs strong filter decision.

In a case where the strong filter decision in step S158 is true, the process proceeds to step S159, and the decision unit 310 decides that the strong filter is applied and sets application of the strong filter. Then, the filtering unit 320 performs a filtering process of applying the strong filter to the partial block boundary, and the process ends.

Furthermore, in a case where the strong filter decision in step S158 is false, the process proceeds to step S161.

On the other hand, in a case where it is decided in step S153 that the size of the adjacent sub-block in the direction orthogonal to the partial block boundary is not eight pixels or more, the process proceeds to step S160.

In step S160, the decision unit 310 decides the block size of the adjacent sub-block adjacent to the partial block boundary among the sub-blocks obtained by dividing the block set in the ISP.

In step S150, in a case where the block size of the adjacent sub-block is decided to be 4×N or N×4, that is, in a case where the size of the adjacent sub-block in the direction orthogonal to the partial block boundary is four pixels, the process proceeds to step S161.

In step S161, the decision unit 310 performs weak filter decision.

In a case where the weak filter decision in step S161 is false, the process proceeds to step S163.

In a case where the weak filter decision in step S161 is true, the process proceeds to step S162, and the decision unit 310 decides that the weak filter is applied and sets application of the weak filter. Then, the filtering unit 320 performs a filtering process of applying the weak filter to the partial block boundary, and the process ends.

On the other hand, in a case where it is decided in step S160 that the size of the adjacent sub-block in the direction orthogonal to the partial block boundary is not four pixels, the process proceeds to step S163. In step S163, the decision unit 310 decides that the deblocking filter is not applied, and the filtering unit 320 does not apply the deblocking filter to (pixels of a line orthogonal to) the partial block boundary, and the process ends.

Thus, in a case where the size of the adjacent sub-block in the direction orthogonal to the partial block boundary is less than four pixels, that is, in a case where the block size of the adjacent sub-block adjacent to the partial block boundary in the vertical direction is 1×N or 2×N, or in a case where the block size of the adjacent sub-block adjacent to the partial block boundary in the horizontal direction is N×1 or N×2, the application of the deblocking filter is limited (the deblocking filter is not applied).

According to FIG. 15, in the deblocking filter 31*a*, for the sub-block boundary of the sub-blocks obtained by dividing the block set in the ISP, it is decided whether or not the block size of the adjacent sub-block adjacent to the sub-block boundary is 8×N or more, or N×8 or more, that is, whether or not the size of the sub-block in the direction orthogonal to the sub-block boundary is eight pixels or more. Then, in a case where the size of the sub-block in the direction orthogonal to the sub-block boundary is eight pixels or more, any one of the long filter, the strong filter, and the weak filter can be applied.

Furthermore, according to FIG. 15, in the deblocking filter 31*a*, for the sub-block boundary of the sub-blocks obtained by dividing the block set in the ISP, in a case where the block size of the adjacent sub-block adjacent to the sub-block boundary is neither 8×N or more nor N×8 or more, it is decided whether or not the block size is 4×N or N×4, that is, whether or not the size of the sub-block in the direction orthogonal to the sub-block boundary is four pixels. Then, in a case where the size of the sub-block in the direction orthogonal to the sub-block boundary is four pixels, the weak filter can be applied.

Moreover, according to FIG. 15, in a case where the block size of the adjacent sub-block adjacent to the sub-block boundary is neither 8×N or more nor N×8 or more, and neither 4×N or more nor N×4 or more, that is, in a case where the size of the sub-block in the direction orthogonal to the sub-block boundary is less than four pixels, the application of the deblocking filter is limited.

Thus, it can be said that in the deblocking filter 31*a*, for the sub-block boundary of the sub-blocks obtained by dividing the block set in the ISP, it is decided whether or not the deblocking filter is applied, depending on the block size of the adjacent sub-block adjacent to the sub-block boundary.

Moreover, it can be said that the filter type (long filter, strong filter, and weak filter) of the deblocking filter to be applied is set (decided) depending on the block size of the adjacent sub-block.

Others (Application Target of the Present Technology)

The present technology can be applied to any image coding/decoding method. That is, unless inconsistent with the present technology described above, the specifications of various processes related to image coding/decoding, such as transform (inverse transform), quantization (inverse quantization), coding (decoding), and prediction, are arbitrary, and are not limited to the examples described above. Furthermore, unless inconsistent with the present technology described above, some of these processes may be omitted.

(Block)

Furthermore, in the present specification, "block" (not a block indicating a processing unit) used for description as a partial area or a unit of processing of an image (picture) indicates an arbitrary partial area in a picture, unless otherwise specified, and the size, shape, characteristics, and the like are not limited. For example, the "block" includes arbitrary partial areas (units of processing) such as the transform block (TB), transform unit (TU), prediction block (PB), prediction unit (PU), smallest coding unit (SCU), coding unit (CU), largest coding unit (LCU), coding tree block (CTB), coding tree unit (CTU), transform block, sub-block, macroblock, tile, or slice described in the reference documents REF1 to REF3 and the like.

(Unit of Processing)

A unit of data in which the various types of information described above is set, and a unit of data targeted by the various processes each are arbitrary and are not limited to the examples described above. For example, these information and processes each may be set for each Transform Unit (TU), Transform Block (TB), Prediction Unit (PU), Prediction Block (PB), Coding Unit (CU), Largest Coding Unit (LCU), sub-block, block, tile, slice, picture, sequence, or component, or data in units of data of those may be targeted. Of course, the unit of data can be set for each piece of information or process, and it is not necessary that the units of data of all the information and processes are unified. Note that, a storage location of these pieces of information is arbitrary, and may be stored in the header, parameter set, or the like of the unit of data described above. Furthermore, those may be stored in a plurality of locations.

(Control Information)

Control information related to the present technology described above may be transmitted from the coding side to the decoding side. For example, control information (for example, enabled_flag) may be transmitted that controls whether or not the application of the present technology described above is permitted (or prohibited). Furthermore, for example, control information may be transmitted indicating an object to which the present technology is applied (or an object to which the present technology is not applied). For example, control information may be transmitted that specifies the block size (upper limit, lower limit, or both), frame, component, layer, or the like to which the present technology is applied (or for which application is permitted or prohibited).

(Block Size Information)

In specification of the size of the block to which the present technology is applied, the block size may not only be directly specified, but also be specified indirectly. For example, the block size may be specified by using identification information for identifying the size. Furthermore, for example, the block size may be specified by a ratio to or a difference from the size of a reference block (for example, the LCU, the SCU, and the like). For example, in a case where information for specifying the block size is transmitted as a syntax element or the like, the information for indirectly specifying the size as described above may be used as the information. By doing so, the amount of information can be reduced, and the coding efficiency can be improved in some cases. Furthermore, the specification of the block size also includes specification of a block size range (for example, specification of an allowable block size range, or the like).

Others

Note that, in the present specification, the "flag" is information for identifying a plurality of states, and includes not only information used for identifying two states of true (1) or false (0), but also information capable of identifying three or more states. Thus, values that can be taken by the "flag" may be, for example, two values of 1/0, or three or more values. That is, the number of bits constituting the "flag" is arbitrary, and may be 1 bit or a plurality of bits. Furthermore, the identification information (including the flag) is assumed to include not only the identification information in the bitstream but also difference information of the identification information with respect to a certain reference information in the bitstream, so that the "flag" and "identification information" include not only the information but also the difference information with respect to the reference information, in the present specification.

Furthermore, various types of information (metadata, and the like) regarding the coded data (bitstream) may be transmitted or recorded in any form as long as those are associated with the coded data. Here, a term "associate" means that, for example, when processing one data, the other data is made to be usable (linkable). That is, the data associated with each other may be collected as one data, or may be individual data. For example, information associated with coded data (image) may be transmitted on a transmission line different from that for the coded data (image). Furthermore, for example, the information associated with the coded data (image) may be recorded in a recording medium different from that for the coded data (image) (or in a different recording area of the same recording medium). Note that, this "association" may be a part of data, not the entire data. For example, an image and information corresponding to the image may be associated with each other in an arbitrary unit such as a plurality of frames, one frame, or a portion within a frame.

Note that, in this specification, terms "combine", "multiplex", "add", "integrate", "include", "store", "put in", "enclose, "insert", and the like mean to combine a plurality of objects into one, for example, to combine coded data and metadata into one, and the terms mean one method of the "associate" described above.

The present technology can also be implemented as any configuration constituting a device or system, for example, a processor as a system large scale integration (LSI) or the like, a module using a plurality of processors and the like, a unit using a plurality of modules and the like, a set in which other functions are further added to the unit, or the like (that is, a configuration of a part of the device).

<Description of Computer to which the Present Technology is Applied>

Next, a series of processes described above can be performed by hardware or software. In a case where the series of processes is performed by software, a program constituting the software is installed in a general-purpose computer or the like.

Figure 16:
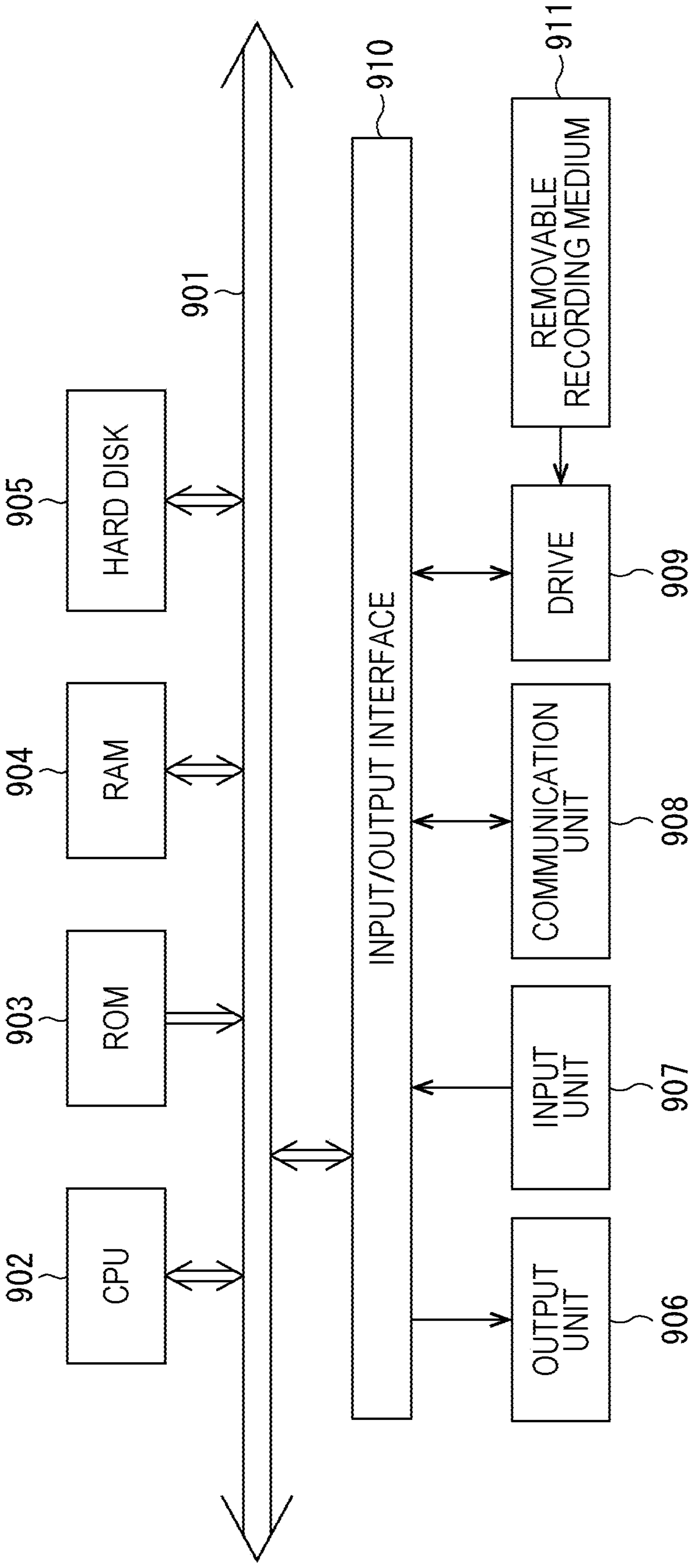
FIG. 16 is a block diagram illustrating a configuration example of an embodiment of a computer to which the present technology is applied.

FIG. 16 is a block diagram illustrating a configuration example of an embodiment of a computer in which a program for executing the series of processing described above is installed.

The program can be recorded in advance on a hard disk 905 or a ROM 903 as a recording medium incorporated in the computer.

Alternatively, the program can be stored (recorded) in a removable recording medium 911 driven by a drive 909. Such a removable recording medium 911 can be provided as so-called packaged software. Here, examples of the removable recording medium 911 include a flexible disk, a Compact Disc Read Only Memory (CD-ROM), a Magneto Optical (MO) disk, a Digital Versatile Disc (DVD), a magnetic disk, a semiconductor memory, and the like.

Note that, the program can be installed on the computer from the removable recording medium 911 as described above, or can be downloaded to the computer via a communications network or a broadcast network and installed on the hard disk 905 incorporated. That is, for example, the program can be wirelessly transferred from a download site to the computer via an artificial satellite for digital satellite broadcasting, or can be transmitted to the computer via a network such as a Local Area Network (LAN) or the Internet by wire.

The computer incorporates a Central Processing Unit (CPU) 902, and an input/output interface 910 is connected to the CPU 902 via a bus 901.

The CPU 902 executes the program stored in the Read Only Memory (ROM) 903 according to a command when the command is input by a user operating an input unit 907 or the like via the input/output interface 910. Alternatively, the CPU 902 loads the program stored in the hard disk 905 into a random access memory (RAN) 904 and executes the program.

The CPU 902 therefore performs the processing according to the above-described flowchart or the processing performed by the configuration of the above-described block diagram. Then, the CPU 902 causes the processing result to be output from an output unit 906 or transmitted from a communication unit 908 via the input/output interface 910 as necessary, and further, recorded on the hard disk 905, for example.

Note that, the input unit 907 includes a keyboard, a mouse, a microphone, and the like. Furthermore, the output unit 906 includes a Liquid Crystal Display (LCD), a speaker, and the like.

Here, in the present specification, the process performed by the computer in accordance with the program does not necessarily have to be performed chronologically in the order described as the flowchart. That is, the process performed by the computer in accordance with the program also includes processes executed in parallel or individually (for example, parallel process or process by an object).

Furthermore, the program may be processed by one computer (processor) or may be distributed and processed by a plurality of computers. Moreover, the program may be transferred to a remote computer and executed.

Moreover, in the present specification, a system means a set of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Note that, the embodiment of the present technology is not limited to the embodiments described above, and various modifications are possible without departing from the scope of the present technology.

For example, the present technology can adopt a configuration of cloud computing that shares one function in a plurality of devices via a network to process the function in cooperation.

Furthermore, each step described in the above flowchart can be executed by sharing in a plurality of devices, other than being executed by one device.

Moreover, in a case where a plurality of processes is included in one step, the plurality of processes included in the one step can be executed by being shared in a plurality of devices, other than being executed by one device.

Furthermore, the advantageous effects described in the present specification are merely examples and are not limited to them, and other effects may be included.

REFERENCE SIGNS LIST

10 Image processing system
11 Encoder
21 A/D conversion unit
22 Screen rearrangement buffer 22
23 Calculation unit
24 Orthogonal transform unit
25 Quantization unit
26 Lossless encoding unit
27 Accumulation buffer
28 Inverse quantization unit
29 Inverse orthogonal transform unit
30 Calculation unit
31*a*, 31*b* Deblocking filter
32 Frame memory
33 Selection unit
34 Intra prediction unit
35 Motion prediction/compensation unit
36 Predicted image selection unit
37 Rate control unit
41 Adaptive offset filter
42 ALF
51 Decoder
61 Accumulation buffer
62 Lossless decoding unit
63 Inverse quantization unit
64 Inverse orthogonal transform unit
65 Calculation unit
67 Screen rearrangement buffer
68 D/A conversion unit
69 Frame memory
70 Selection unit
71 Intra prediction unit
72 Motion prediction/compensation unit
73 Selection unit
81 Adaptive offset filter
82 ALF
261 Boundary strength decision unit
310 Decision unit
311 Filtering decision unit
312 Filtering strength decision unit
320 Filtering unit
330 Line buffer
340 Controller
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. An image processing device comprising:
circuitry configured to
decode a bitstream to generate a decoded image according to a block structure having a hierarchical structure in which a transformation block, a prediction block, and a coding block are unified;
determine whether or not to apply a deblocking filter according to a block size of a sub-block obtained by dividing the transform block;
in response to the block size of the sub-block of the line orthogonal to the sub-block boundary between the sub-blocks being less a predetermined size, the deblocking filter is not applied; and
in response to the block size of the sub-block of the line orthogonal to the sub-block boundary between the sub-blocks being equal to or greater than the predetermined size, apply the deblocking filter to pixels on a line orthogonal to a block boundary, wherein
the circuitry is configured to determine a filter type of the deblocking filter such that a pixel modification range of the deblocking filter does not exceed the block size of sub-block in the direction orthogonal to the sub-block boundary.

2. The image processing device according to claim 1, wherein the circuitry is further configured to apply the deblocking filter to pixels on a line orthogonal to the sub-block boundary in accordance with a boundary strength that is set according to characteristics of adjacent sub-blocks adjacent to each other across the sub-block boundary.

3. The image processing device according to claim 2, wherein the circuitry is configured to apply the deblocking filter to pixels on a line orthogonal to the sub-block boundary of a sub-block obtained by dividing the transform block on which intra prediction is performed.

4. The image processing device according to claim 3, wherein the circuitry is configured to apply the deblocking filter to pixels on a line orthogonal to the sub-block boundary in accordance with a boundary strength that is set to be the same as a block boundary of the transform block on which intra prediction is performed.

5. The image processing device according to claim 1, wherein the circuitry is configured to apply the deblocking filter of a filter type set according to the block size of the sub-block.

6. The image processing device according to claim 1, wherein the sub-block is a sub-partition obtained by dividing the transform block using an intra-sub-partition (ISP) mode.

7. The image processing device according to claim 1, wherein the predetermined size is 4 or 8 samples in the direction orthogonal to the sub-block boundary.

8. The image processing device according to claim 1, wherein the circuitry is configured to determine the filter type such that the pixel modification range is no more than half of the block size of the sub-block in the direction orthogonal to the sub-block boundary.

9. The image processing device according to claim 1, wherein the sub-block boundary is either a vertical boundary or a horizontal boundary, and the circuitry is configured to apply the determination to both the vertical boundary and the horizontal boundary.

10. The image processing device according to claim 1, wherein, in response to the block size of the sub-block being four pixels in the direction orthogonal to the sub-block boundary, the circuitry is configured to select a weak filter type as the deblocking filter.

11. An image processing method comprising:

decoding a bitstream to generate a decoded image according to a block structure having a unified hierarchical structure of transform blocks, prediction blocks, and coding blocks;

dividing the transform block of the decoded image into sub-blocks, determining whether to apply a deblocking filter depending on the size;

in response to the block size of the sub-block orthogonal to a sub-block boundary being less than a predetermined size, not applying the deblocking filter; and in response to the block size of the sub-block orthogonal to the sub-block boundary being equal to or greater than the predetermined size, determining a filter type of the deblocking filter such that a pixel modification range of the deblocking filter does not exceed the block size of the sub-block in the direction orthogonal to the sub-block boundary, applying the determined deblocking filter to pixels on a line orthogonal to a sub-block boundary.

12. The image processing method according to claim 11, wherein the sub-block is a sub-partition obtained by dividing the transform block using an intra-sub-partition (ISP) mode.

13. The image processing method according to claim 11, wherein the predetermined size is 4 or 8 samples in the direction orthogonal to the sub-block boundary.

14. An image processing device comprising:

circuitry configured to:

obtain a sub-block by dividing a transform block on which intra prediction is performed in a locally decoded image that is locally decoded when an image is encoded according to a block structure having a unified hierarchical structure of transform blocks, prediction blocks, and coding blocks;

determine whether to apply a deblocking filter according to a block size of the sub-block;

in response to the block size of the sub-block orthogonal to a sub-block boundary being less than a predetermined size, not apply the deblocking filter;

in response to the block size of the sub-block orthogonal to the sub-block boundary being equal to or greater than the predetermined size, apply the deblocking filter to pixels on a line orthogonal to a sub-block boundary, wherein the circuitry is configured to determine a filter type of the deblocking filter such that a pixel modification range of the deblocking filter does not exceed the block size of the sub-block in the direction orthogonal to the sub-block boundary; and encode the image using the filter image.

15. The image processing device according to claim 14, wherein the sub-block is a sub-partition obtained by dividing the transform block using an intra-sub-partition (ISP) mode.

16. The image processing device according to claim 14, wherein the predetermined size is 4 or 8 samples in the direction orthogonal to the sub-block boundary.

17. The image processing device according to claim 14, wherein the circuitry is configured to determine the filter type such that the pixel modification range is no more than half of the block size of the sub-block in the direction orthogonal to the sub-block boundary.

18. An image processing method comprising:

obtaining a sub-block by dividing a transform block on which intra prediction is performed in a locally decoded image that is locally decoded when an image is encoded according to a block structure having a unified hierarchical structure of transform blocks, prediction blocks, and coding blocks;

determining whether to apply a deblocking filter according to a block size of the sub-block;

in response to the block size of the sub-block orthogonal to a sub-block boundary being less than a predetermined size, not applying the deblocking filter; and in response to the block size of the sub-block orthogonal to the sub-block boundary being equal to or greater than the predetermined size, determining a filter type of the deblocking filter such that a pixel modification range of the deblocking filter does not exceed the block size of the sub-block in the direction orthogonal to the sub-block boundary; and encoding the image using the filter image.

19. The image processing method according to claim 18, wherein the sub-block is a sub-partition obtained by dividing the transform block using an intra-sub-partition (ISP) mode.

20. The image processing method according to claim 18, wherein the predetermined size is 4 or 8 samples in the direction orthogonal to the sub-block boundary.

* * * * *